J. W. SOMMER, DEC'D.
B. L. SOMMER, EXECUTOR.
WIRE FABRIC MACHINE.
APPLICATION FILED JULY 12, 1907.
1,078,702.
Patented Nov. 18, 1913.
13 SHEETS—SHEET 2.
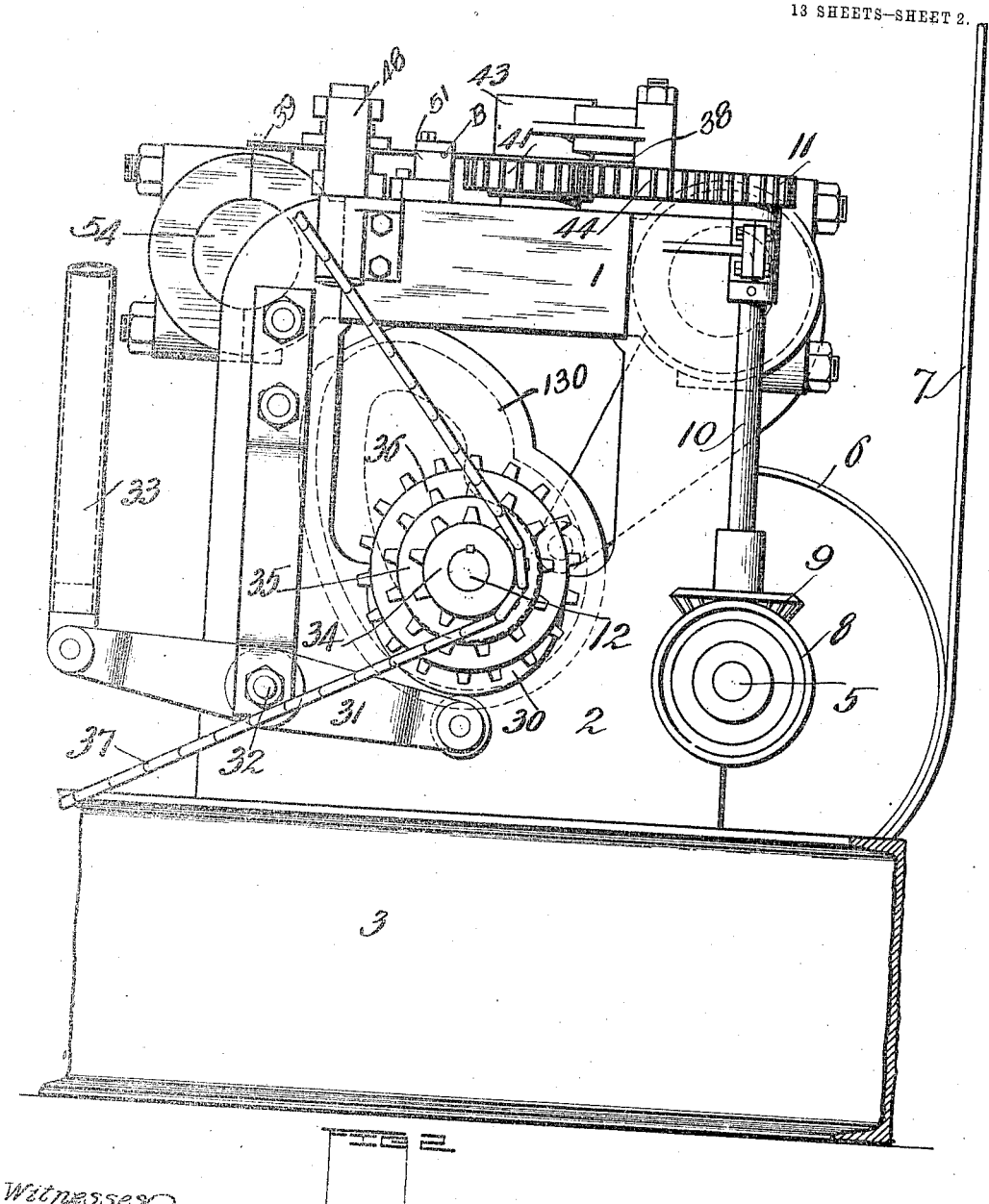

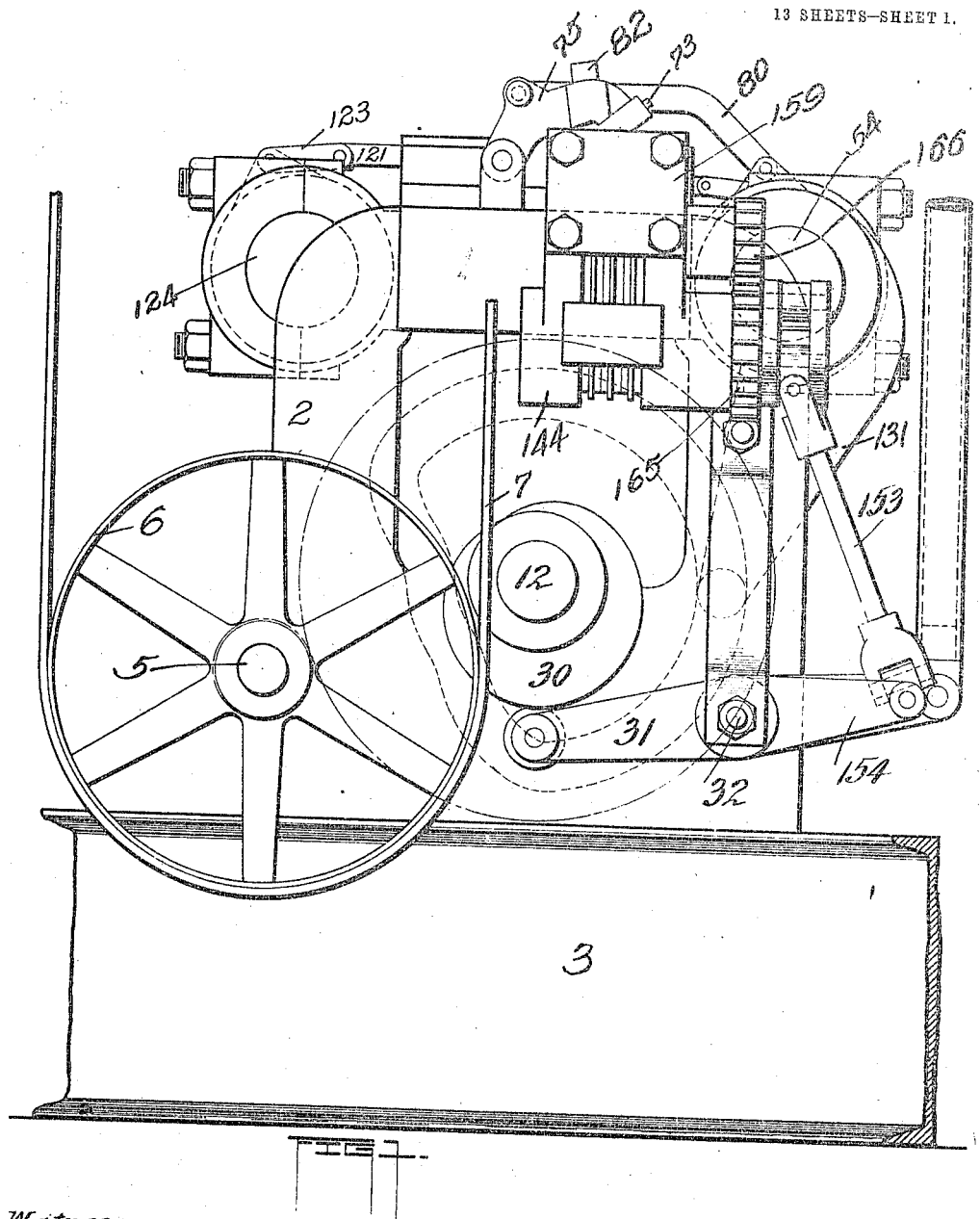

J. W. SOMMER, DEC'D.
B. L. SOMMER, EXECUTOR.
WIRE FABRIC MACHINE.
APPLICATION FILED JULY 12, 1907.
1,078,702.
Patented Nov. 18, 1913.
13 SHEETS—SHEET 3.
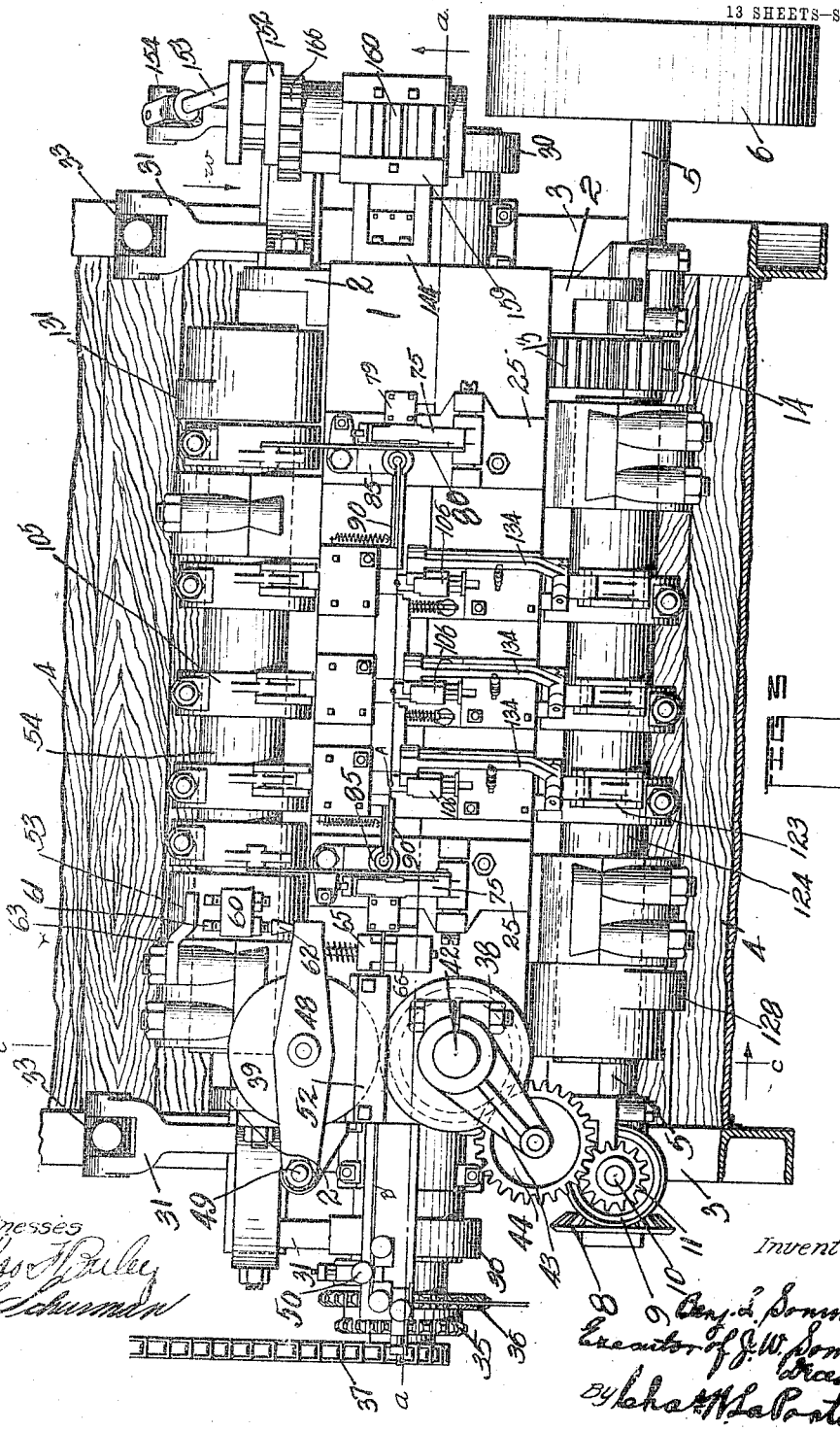

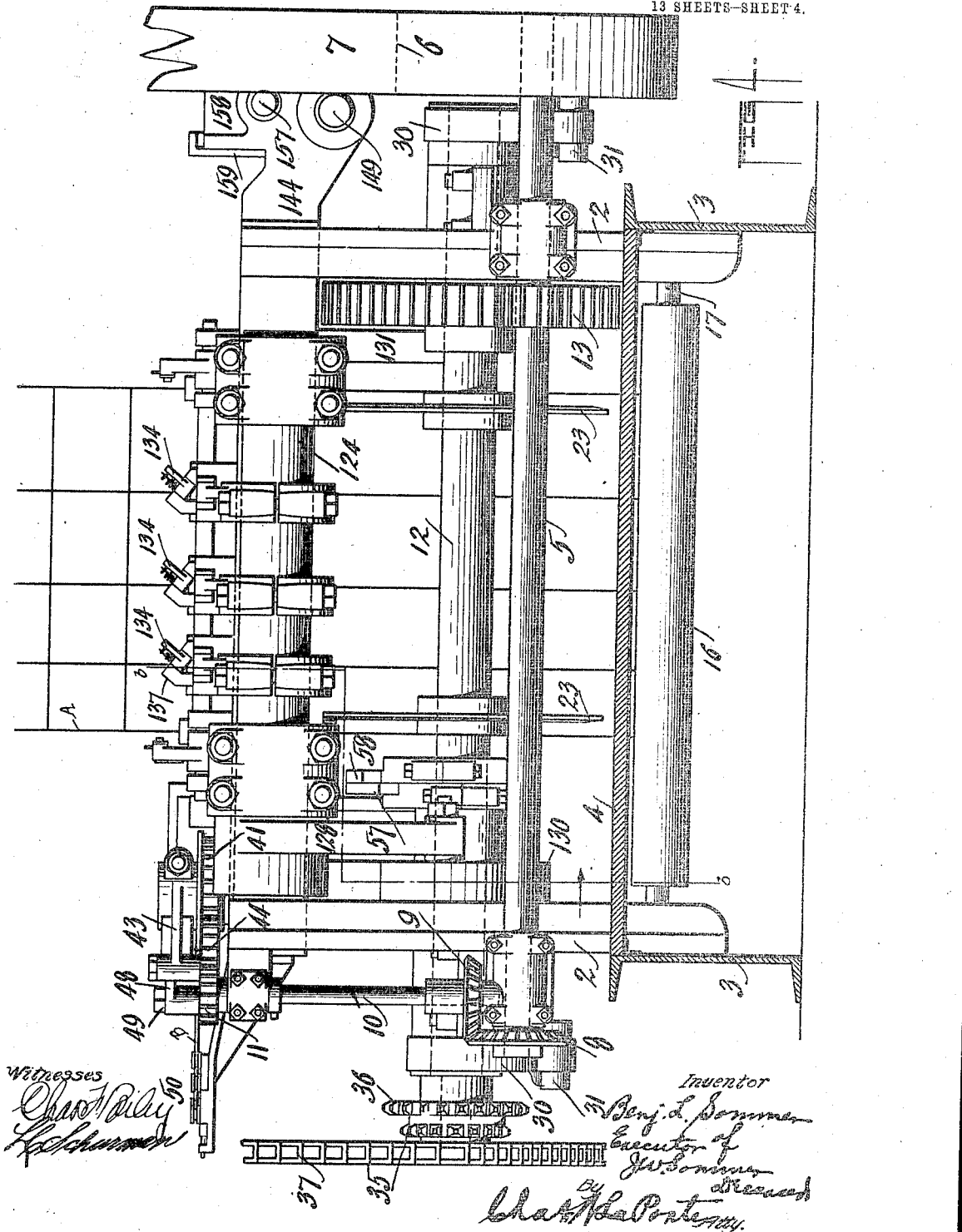

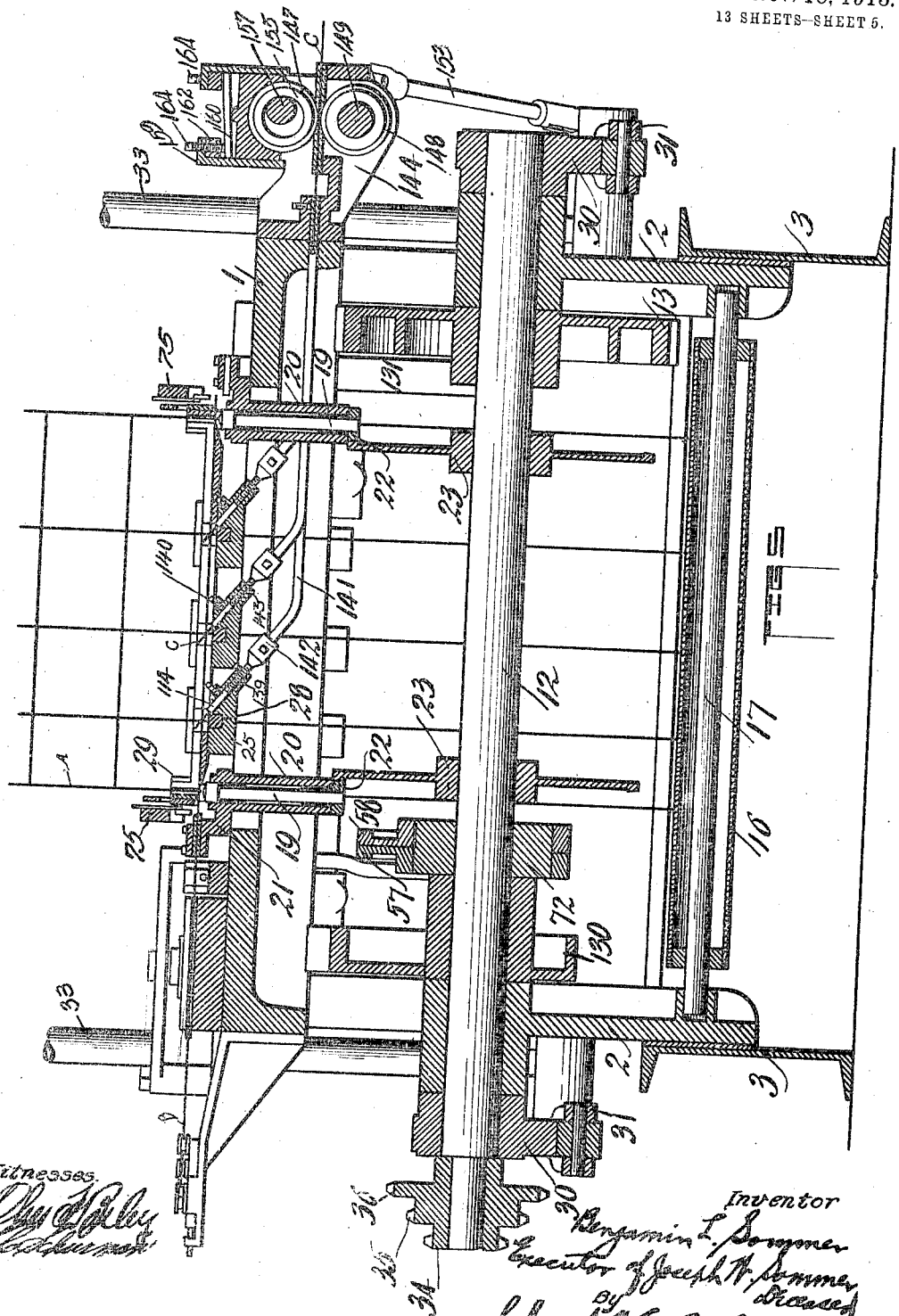

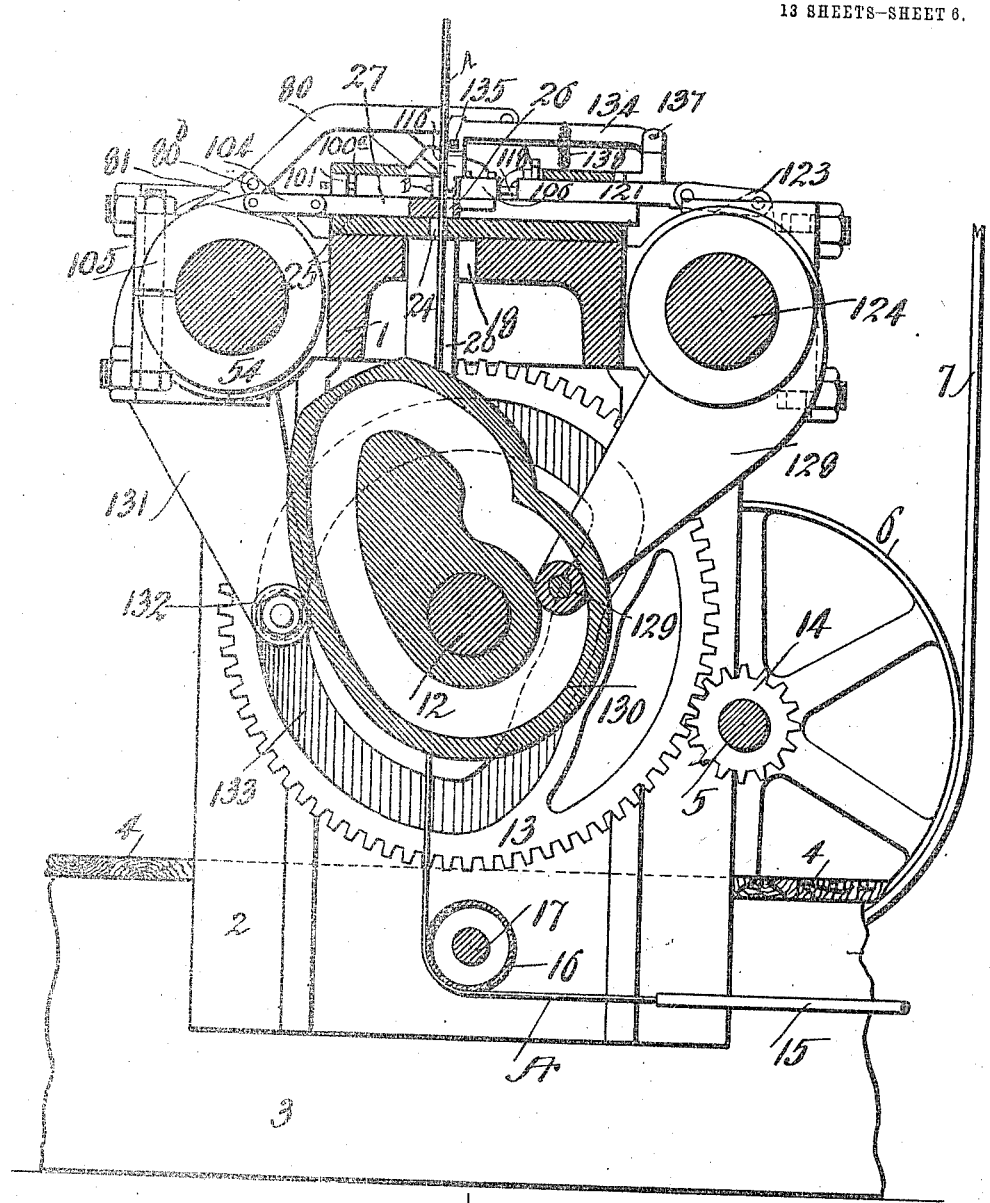

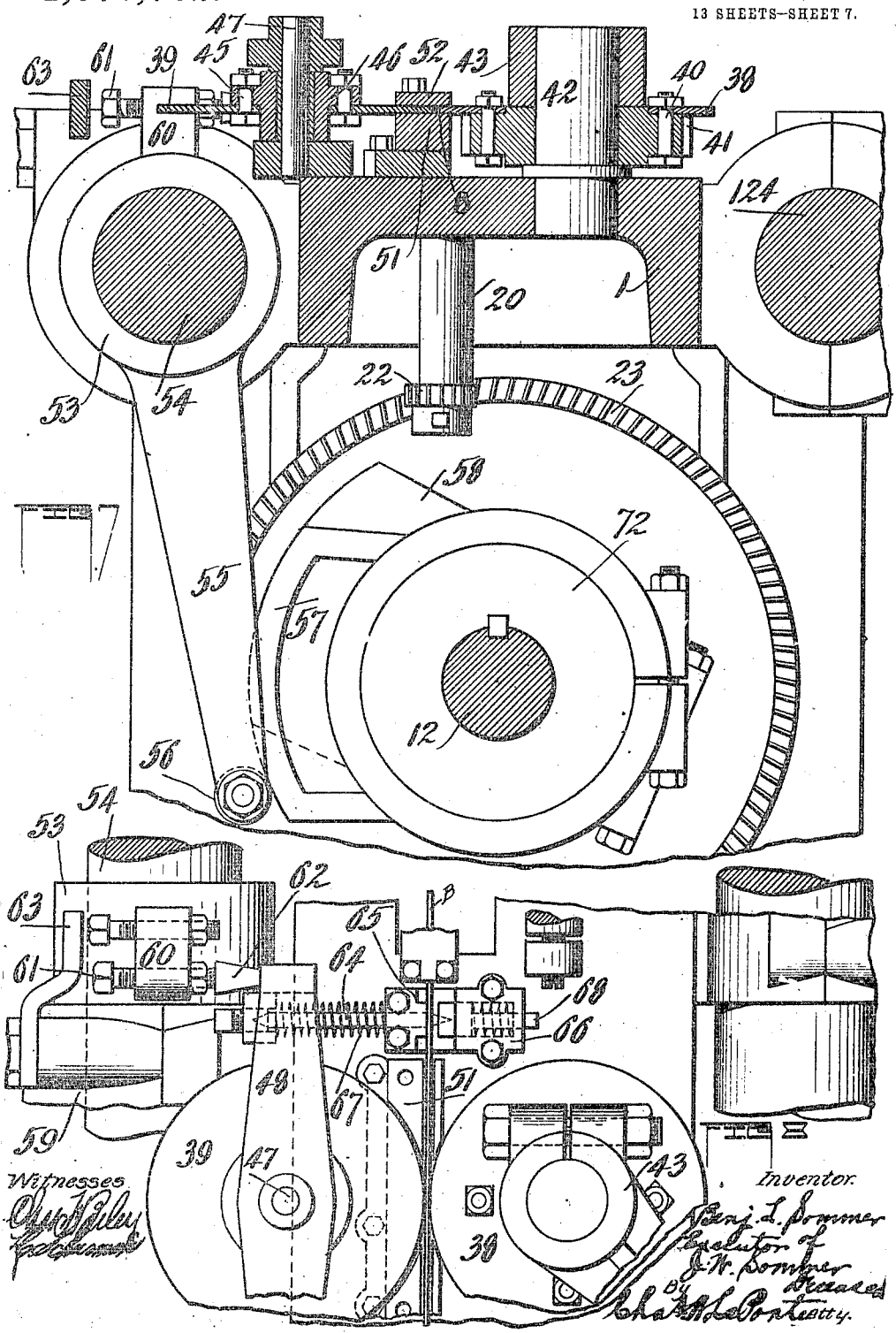

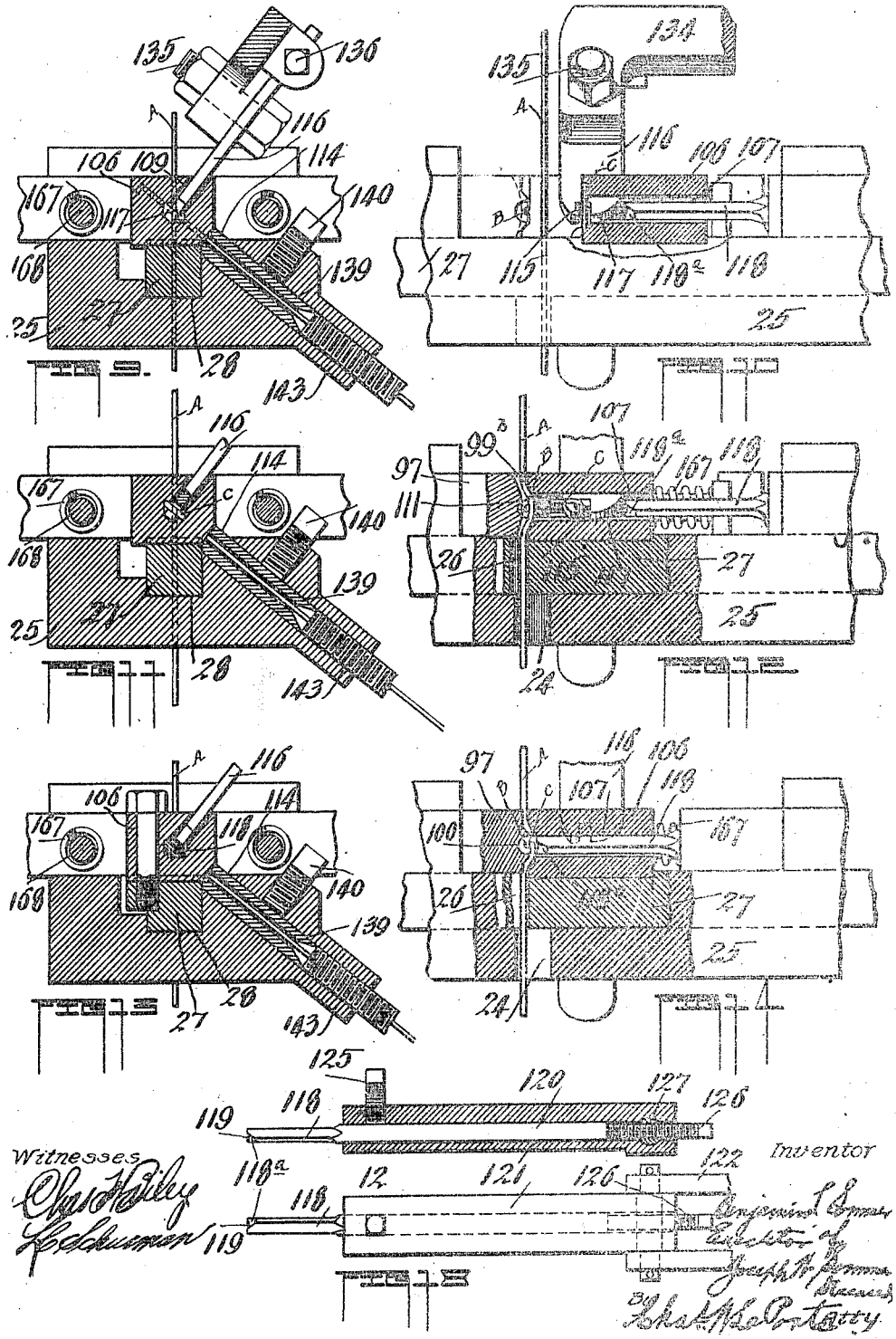

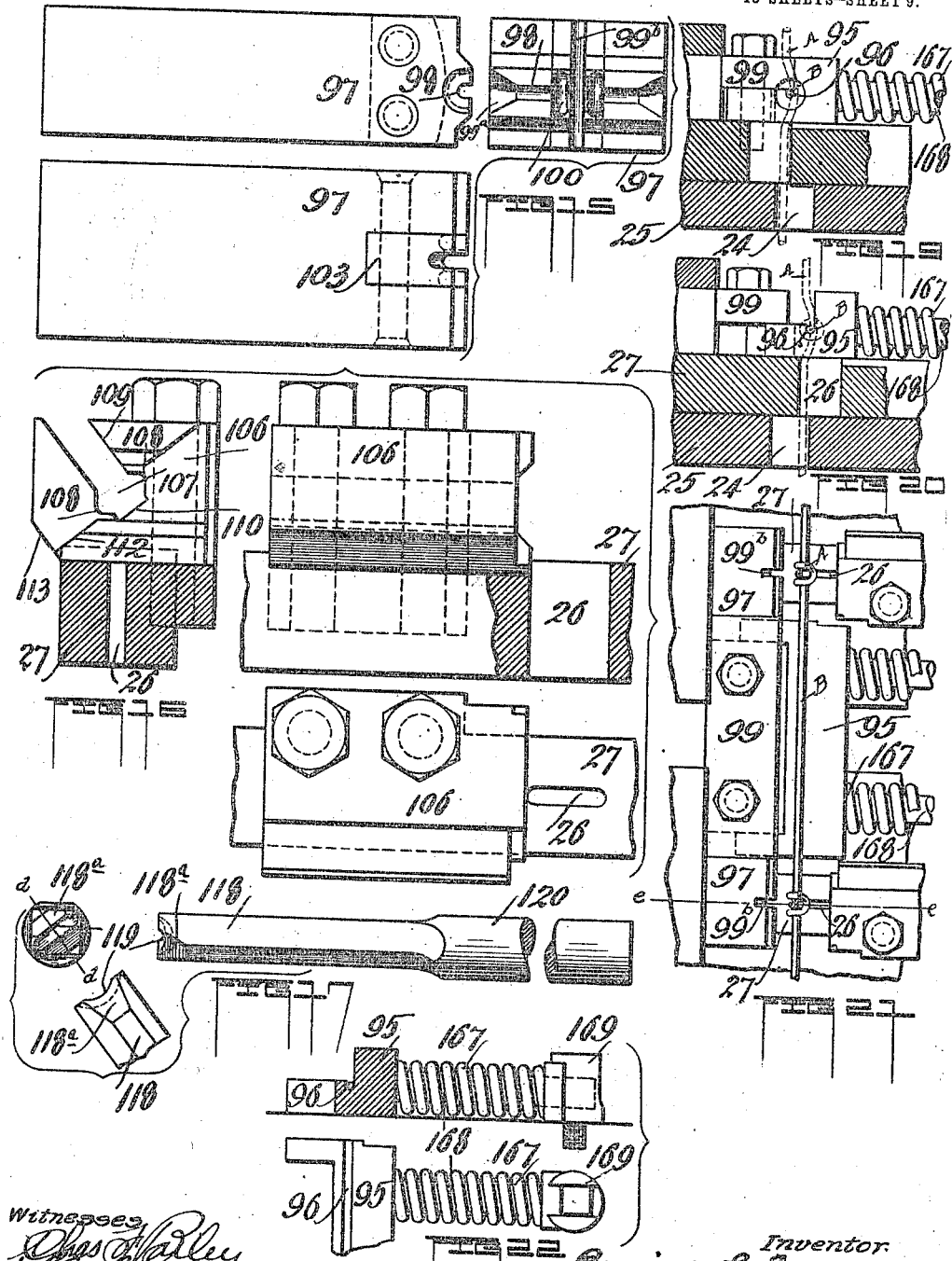

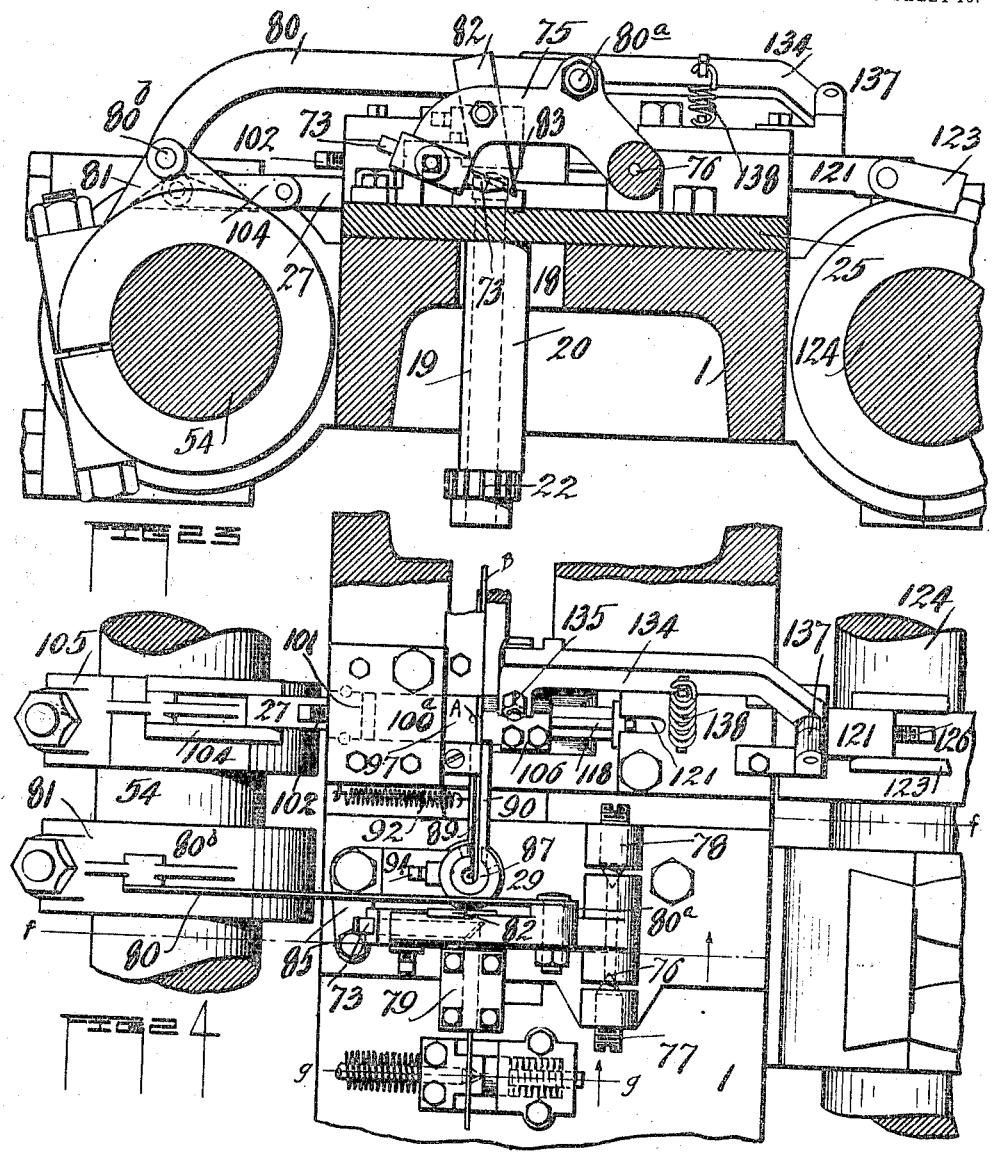

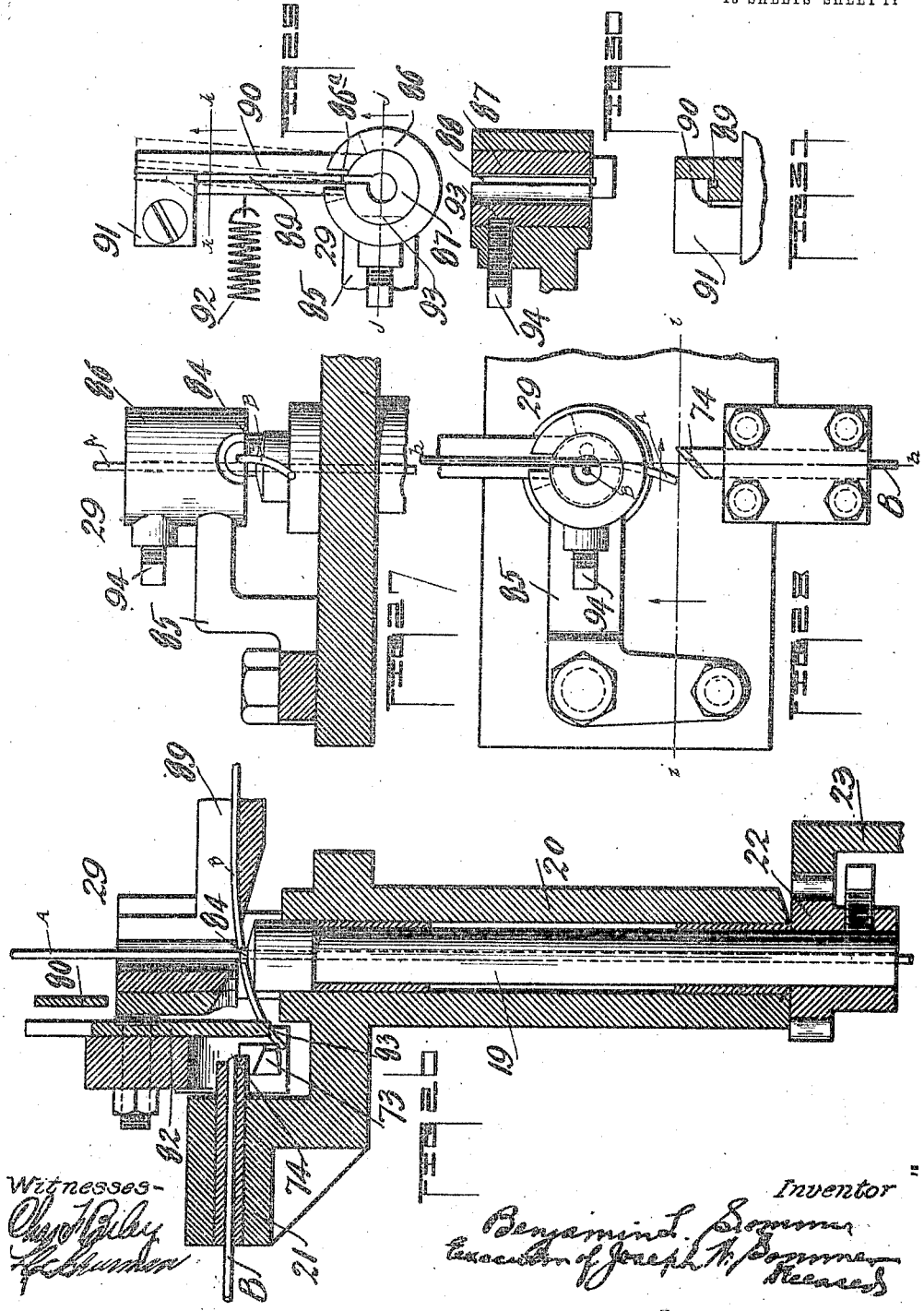

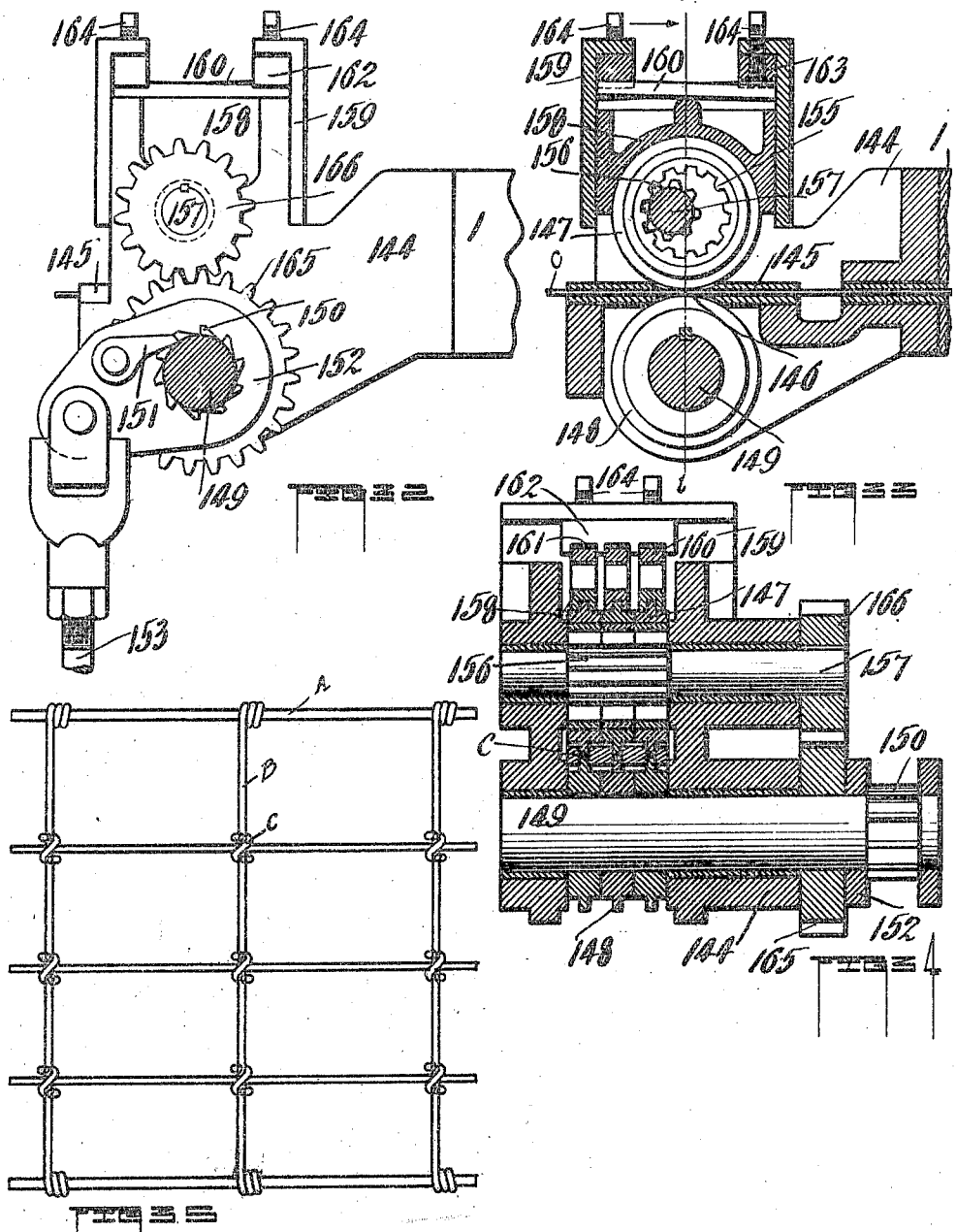

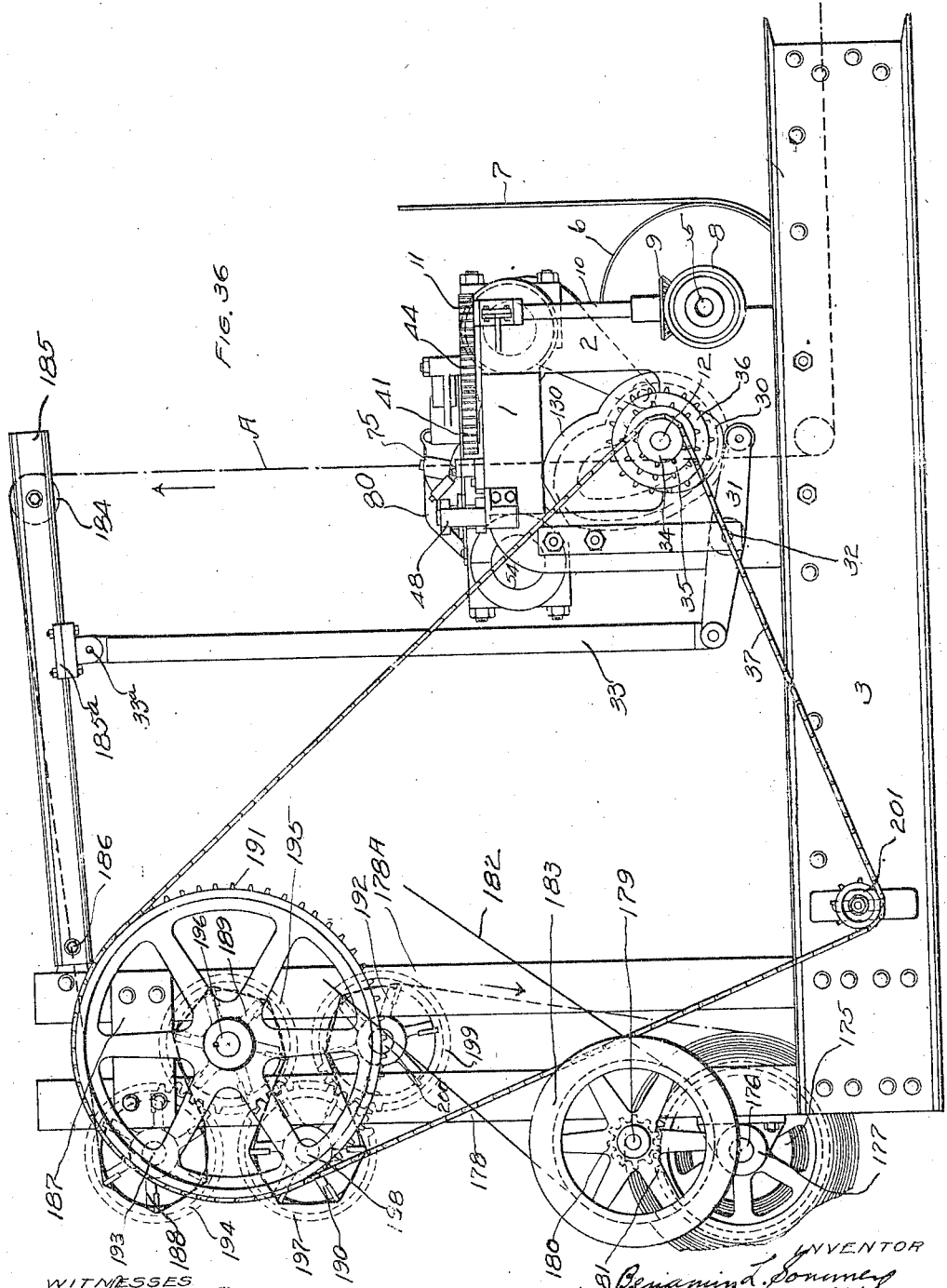

UNITED STATES PATENT OFFICE.

BENJAMIN L. SOMMER, OF PEORIA, ILLINOIS, EXECUTOR OF JOSEPH W. SOMMER, DECEASED, ASSIGNOR TO KEYSTONE STEEL AND WIRE COMPANY, OF SOUTH BARTONVILLE, ILLINOIS, A CORPORATION OF ILLINOIS.

WIRE-FABRIC MACHINE.

1,078,702.  Specification of Letters Patent.  Patented Nov. 18, 1913.

Application filed July 12, 1907. Serial No. 383,522.

*To all whom it may concern:*

Be it known that JOSEPH W. SOMMER, deceased, late a citizen of the United States, residing at Peoria, county of Peoria, State of Illinois, (BENJAMIN L. SOMMER, of Peoria, county of Peoria, State of Illinois, executor of said JOSEPH W. SOMMER), invented certain new and useful Improvements in Wire-Fabric Machines, of which the following is a specification.

This invention has reference to machines for producing wire fabrics and particularly that class of fabrics which are used for farm, field, poultry, and other forms of fence fabrics.

The object of the invention is to produce a wire fence fabric composed of longitudinal running or strand wires and cross or stay wires which are connected to the intermediate longitudinal or running wires by a locking device, preferably of wire, and these locking devices are disposed diagonally across the juncture of the stay and intermediate wires and have their ends coiled concentrically and partially about one of such wires; the ends of such stay wires being preferably coiled or wrapped about what will be hereinafter known as the marginal wires of such fabric.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is an elevation on a greatly reduced scale, looking at one side of the forward end of the machine; Fig. 2 is a similar elevation looking at the opposite side of the said machine; Fig. 3 is a plan of the forward end of the machine, except that it is on a somewhat smaller scale than what is shown in Figs. 1 and 2; Fig. 4 is a front elevation of the machine as the same would appear when looking at the right of Fig. 2, and on a scale corresponding to Fig. 3; Fig. 5 is a vertical longitudinal section as the same would appear if taken on the line $a$—$a$ of Fig. 3; Fig. 6 is a vertical cross section as the same would appear if taken on the line $b$—$b$ of Fig. 4, showing a portion of what is included in the section, in full lines; the view being shown on a little larger scale than the illustration in Fig. 4; Fig. 7 is a cross section in elevation as the same would appear if taken on the line $c$—$c$ of Fig. 3, except that the lower portion of the figure has been broken away and is shown on a somewhat larger scale than Fig. 3; Fig. 8 is an enlarged detail in plan showing the stay feeding mechanism located at the left of Fig. 3; Figs. 9, 10, 11, 12, 13 and 14 show respectively in opposite elevations and partially in section, different stages of the cutting, forming and clenching of the lock for connecting the stays and the strands; Fig. 15 shows enlarged in plan, side elevation and end view, a receiving die; Fig. 16 shows enlarged a side elevation, plan and front elevation of the lock bending device; Fig. 17 shows enlarged a punch or plunger, of which there is a side elevation, end view and a plan, on the line $d$—$d$ indicated on the end view; Fig. 18 is a plan and longitudinal section of the punch or plunger holder for containing the same; Fig. 19 is an enlarged detail in elevation of the stay guide, with component parts in cross section as the same would appear if taken on the line $e$—$e$ of Fig. 21, the dotted line indicating the course of the strand wire when brought into position as shown in Fig. 12; Fig. 20 is a view similar to Fig. 19, except that the parts are in a position to allow the finished fence fabric to be drawn out; Fig. 21 is a partial plan showing one of the stay guides and the parts in the position shown in Fig. 20; Fig. 22 is a plan and an elevation in section of a yielding means coöperating with the stay guides to return the parts thereof in position to receive a stay after the fence fabric has been drawn out; Fig. 23 is an enlarged cross section as the same would appear if taken on the line $f$—$f$ of Fig. 24; Fig. 24 is an enlarged partial plan showing in detail the stay cutting and coiling device at the sides of the machine; Fig. 25 is a cross section as the same would appear if taken on the line $g$—$g$ of Fig. 24; Fig. 26 is an enlarged vertical section of one of the stay coiling, cutting and depressing mechanisms as the same would appear if taken on the line $h$—$h$ of Fig. 28; Fig. 27 is an enlarged cross section as the same would appear on the line $i$—$i$ of Fig. 28; Fig. 28 is a plan of Fig. 27, showing a stay wire, cut and depressed and ready to be coiled; Fig. 29 is an enlarged plan of a stay guiding member which extends from the end coilers to the first die holder; Fig. 30 is a vertical section as the same would appear if taken on the line $j$—$j$ of Fig. 29; Fig. 31 is a vertical section as the same would appear if taken on the line $k$—$k$ of Fig. 29; Fig. 32 is an enlarged elevation of the mechanism for feeding the wires from which the locks are made, as the same would appear looking in the direction indicated by the arrow $w$ in Fig. 3; Fig. 33 is an enlarged cross section of the feed rolls for advancing the wire from which the locks or staples are cut, being the rolls actuated by the mechanism shown in Fig. 32; Fig. 34 is a longitudinal section of the feeding mechanism and feed rolls shown in Figs. 32 and 33, as the same would appear if taken on the line $l$—$l$ of Fig. 33; Fig. 35 is a general view of the product designed to be manufactured on this machine, and Fig. 36 is a side elevation of the complete machine and includes the pull-out, feeding rolls and reel for winding up the completed fence fabric.

Like numerals of reference indicate corresponding parts throughout the figures.

In the drawings, what will be hereinafter known as the base plate which supports the wire feeding and connecting devices, is indicated as 1, and this plate is supported at its opposite ends on the uprights or standards 2, which in turn are supported or connected with a base comprising a pair of longitudinal and spaced channel beams 3. In the front and in the rear of the standards 2 and supported by the channel beams 3 is a platform indicated as 4 on which an operator or inspector may stand.

Having a bearing at or near its opposite ends in boxings which are supported by the uprights 2 is a drive shaft 5, on one end of which is a pulley 6 driven by means of a belt 7 which receives its power from some suitable source; and on the opposite end of the said driving shaft is a bevel gear 8, in mesh with a bevel gear 9 on the lower end of a vertically disposed shaft 10. This shaft is journaled in suitable bearings supported by one of the uprights 2 and on its upper end is carried a gear 11. The object of the shaft 10 and its gear 11 will be further explained.

12 denotes a cam shaft, although it will be hereinafter referred to as the time shaft, and the reason for calling it the time shaft is that each operation of the respective parts, to be hereinafter described, for connecting a stay to a series of intermediate strands and marginal wires is governed by approximately one revolution of the shaft 12, and the cams which are carried by said shaft, to be described, are the means in connection with certain other mechanisms for transmitting motion to the wire connecting devices. The shaft 12 receives its power from the driving shaft through the gear 13 on the time shaft, which is in mesh with the pinion 14 on the driving shaft.

The present construction provides for feeding in strand wires in the lower portion of the machine, from reels, spools, or in any other suitable manner, and for convenience the running wires composed of the intermediate and marginal strands are indicated as A. They pass preferably through tubes 15 which are parallel with the channel beams 3 and at a point where it is designed to direct such wires upwardly or vertically through the machine, they pass around a drum or roller 16, carried by a shaft 17 which is journaled at its opposite ends in suitable bearings attached to or forming a part of the uprights 2. The intermediate strand wires pass up through the base plate 1, while the marginal wires pass up through coiling spindles 19, which have a bearing in the vertically disposed housings 20 which depend from and may be secured to or an integral part of brackets 21, supported by the base plate 1; the housing for said coiling spindles extending down through the opening 18 in the base plate. On the lower ends of these spindles are pinions 22 in mesh with corresponding gear wheels 23 which are attached to the time shaft 12. Each of said intermediate strands also passes through suitable openings 24 in transversely disposed bed plates 25 which are supported on the base plate, and such wires also pass through slots 26 arranged in bars 27 which are reciprocally mounted in longitudinal grooves 28 arranged in said bed plates 25, such grooves being best seen in Figs. 5 and 9. The marginal wires as they leave the spindles, pass up through guides which will be generally referred to as 29 supported by the base plate 1 and hereinafter more fully described.

The intermediate and marginal wires referred to as A to which the stays or cross wires are attached are adapted to be reeled up on the wrapper 175 carried on the wrapper shaft 176 journaled in bearings 177 secured to uprights 178 which are duplicated upon opposite sides of the machine and secured to and supported by the channel beams 3. The wrapper shaft 176 is driven from a short shaft 179, (see Fig. 36) on which is carried a pinion 180 meshing with a gear wheel 181 on the wrapper shaft 176, and the short shaft 179 is driven by means of the belt 182 which receives its power from any suitable source, and the driving pulley 183 driven by the belt 182. The wires A leaving the connecting mechanisms are directed up and over the roller 184, (see Fig. 36) which is journaled in a pair of similar beams 185, only one of which is shown, and said beams are pivoted at 186 to the upper ends of uprights 178ᴬ which are similar to uprights 178 and secured to and supported by the channel beams 3. The upper ends of the uprights 178 and 178ᴬ are connected by the brace 187. The wires A leaving the roller 184 are directed to, over and around a plurality of pulling-out rollers, drums or spiders 188, 189, 190 and 192. The technical term for these pulling-out rollers, drums or spiders is "butterflies"; and they are so constructed and arranged as to not only pull out the finished fence fabric after the stays are connected to the longitudinal wires, but also crimp the longitudinal wires; and said longitudinal wires, as previously indicated, together with the connected stays or cross-wires are wrapped up on the wrapper 175. The pulling out roller 188 is carried on a shaft 193 which carries a gear wheel 194 and said gear wheel meshes with a gear wheel 195 on a shaft 196, which said shaft carries the pulling out roller 189 and the gear wheel 195 meshes with a gear wheel 197 on a shaft 198, which said shaft carries the pulling out roller 190 and the gear wheel 197 meshes with a gear wheel 199 on a shaft 200, which said shaft carries the pulling out roller 192. These pulling out rollers 188 and 189, 190 and 192, through the gearing mentioned as carried by the shafts on which the pulling out rollers are mounted, are operated from the timing shaft 12.

On the opposite ends of the timing shaft 12 are carried cams 30, (see Figs. 1, 2, 5 and 36), which operate a pair of levers 31, fulcrumed at 32 in a suitable manner to the uprights 2 and connecting with the outer ends of said levers 31 are rods 33 which at their upper ends are pivotally connected at 33ᵃ to blocks 185ᵃ which are adjustably connected to be moved longitudinally on the beams 185. The adjustment of the blocks 185ᵃ on the beams 185 will determine the amount of operation of the beams 185 during the stroke of the rods 33 which is for the purpose of adjusting the pull-out to four, six, nine and twelve inch stays. The parts of the mechanism are so timed that after the connection of a stay or cross wire to the longitudinal wires the rods 33 will be operated to lift the beams 185, moving the fabric the distance it is desired to place the stays. In other words, the raising of the beams 185 uniformly draws an equal amount of the longitudinal wires past the connecting mechanisms and the lowering of said beams preparatory to drawing the longitudinal wires past the connecting mechanisms will leave some slack in the wires. The taking up rollers or spiders above referred to being continuously driven take care of the finished fabric and take up the slack in the longitudinal wires during the interval of lowering the beams 185, which pulls the wires taut. The pulling out rollers are driven from one of a series of sprocket wheels 34, 35 and 36 carried on one end of the timing shaft 12, see Figs. 2, 5 and 36 which operate a link belting 37 or some other suitable and similar means for transmitting motion and said link belting 37 operates a sprocket wheel 191 on the pulling out shaft 196 and said link belting also passes around an idler 201 adjustably mounted on the channel beam 3 shown in Fig. 36. The location of the idler 201 is such that a free space is left between the uprights 178 and 178ᴬ and the wire connecting mechanisms to allow an operator to pass between the portions of the link belting 37 leading to and from the sprocket wheel 191.

The features above described form no particular part of this invention, except as they are necessary to coöperate with the working parts of the machine to assist in feeding the longitudinal wires through the machine and to wrap up the completed fabric.

Having described the feed and direction of movement of the running wires comprising the intermediate and marginal strands, the next in order will be to describe how the stay wires are projected across the strands, cut into proper lengths and thereafter connected by suitable locking means to the running wires.

The mechanism for feeding the stay wires which are cut into proper lengths from a blank B, fed from reels, spools or in any other suitable manner, comprise a pair of feed rolls 38 and 39, see Figs. 3 and 8, the former serving as a driving roll, and the latter serving as the driven roll and adapted to be intermittently driven by the driving roll. The driving roll is preferably made in the form of an annular plate or ring which has a detachable connection by means of the bolts 40 with a gear wheel 41, see Fig. 7, and the gear wheel is carried on a stud 42 having a bearing at its lower end in the base plate 1 and its upper end is journaled in one end of an arm 43, the outer end of said arm carrying a gear wheel 44 which meshes with the gear wheel 41 to which the feed roll 38 is attached and meshing with the gear wheel 44 is the pinion 11 on the upper end of the vertical shaft 10; thus it will be seen that as power is transmitted to the shaft 10 from the driving shaft 5, that through the gearing just described, the feed roll 38 will operate in unison with the operation of the driving shaft. The feed roll 39 is somewhat similar in construction to the feed roll 38, comprising an annular plate or ring which is detachably connected by means of the bolts 45, see Fig. 7, with the hub 46 and this hub has a suitable bearing on a short shaft 47 journaled at its upper and lower ends in a support 48 which is pivotally connected at 49 to the base plate 1, or a suitable extension thereof. Pivoting the support 48 allows for the oscillation of same, by means to be described, for the purpose of positioning the feed roll 39 with respect to the feed roll 38 to facilitate in the said feed rolls projecting a stay blank across the strand wires. The blank from which the stay wires are cut is first fed between straightening rolls 50 which may be similar to any of the well known straightening rolls, and from there the blank passes between the matching faces of the feed rolls 38 and 39 and through a guiding block 51, (best seen in Fig. 8) for which there is a covering plate indicated as 52, and as seen in Fig. 3. It will be seen that during the continuous operation of the feed roll 38 upon moving the support 48 in a direction to cause the feed roll 39 to impinge upon the stay blank, there will be sufficient friction produced between the wire and the two feed rolls to project the stay blank across the machine, and that when the support 48 is moved in the opposite direction the feed of the stay blank is prevented. The support 48 is automatically oscillated and at the time when it is required to project a stay blank across the strand wires. The means for oscillating the support 48 consists substantially of a head or collar 53 which is carried on a rock shaft 54, journaled in suitable boxings 59, see Figs. 7 and 8, although said head has no fixed connection with the said shaft, and depending from the head is an arm 55 carrying at its lower end, a roller 56 which is adapted to be engaged by a cam composed of sections 57 and 58, one or both of which, if it is desirable, may be adjustably carried on the timing shaft 12. The head or collar 53 is provided with a boss 60 and projecting through said boss are preferably a pair of threaded studs 61, one of which is adapted to have engagement with a block or extension 62, attached to or forming a part of the forward or free end of the support 48 for the feed roll 39. The support 48 to which the block 62 is attached is normally held by a suitable yielding means in a position where the feed roll 39 does not so impinge the stay blanks to assist in projecting the same across the strands and in such a position the block 62 may engage with one of the threaded studs 61. But it is intended that as the cam sections 57 and 58 are rotated with the movement of the time shaft 12, that the lower end of the arm 55 will be moved outwardly, which will partially rotate the head or collar 53 on the rock shaft 54 and such movement of the head will, through the engagement of one of the studs with the block or extension 62 of the support 48, swing said support on its pivot and cause the feed roll 39 to impinge the stay wire blanks.

The yielding means which has been referred to for normally holding the feed roll 39 from engagement with the stay wire blanks, consists of a stem 64 which is suitably secured at one end in the forward end of the support 48 and its opposite end is movably carried through a guide plate 65 which is attached to a block 66 supported on the base plate 1 and between the guide plate and support 48 on the stem 64 is carried a spring 67; thus, when the arm 55 of the head or collar 53 is relieved from pressure through action of the cam sections 57 and 58, the spring 67 will act to normally hold the support 48 in the manner previously described and serves to return the support 48 to its normal position immediately after the sections of the cam 57 and 58 move away from the roller 56. For stopping the return movement of the head or collar 53 under the action of the spring 67, as aforesaid, a bar or arm 63 is provided, which is secured to the boxings 59 adjacent to the said head which projects across and above the head 53 and in the path of movement of the threaded lugs so that as the head is returned the lugs will abut with the bar or arm 63 and thereby limit its movement.

The guide plate 65 together with means movably carried on the block 66 serves as a gripper for the stay wire blank immediately upon the feed roll 39 being moved from engagement with the said blank, but upon moving the feed roll 39 to engage said blank, the stem 64, in a manner to be described, operates to release the gripping means to allow the blank to be projected across the strands. The means referred to coöperating with the guide plate 65 comprises a stem 68 provided with or having attached thereto, a suitable head 69. The stem is carried in a recessed portion 70 in the block 66, and has a sliding movement in the end wall of the said block, and in the recess 70 is carried a spring 71 which encircles the stem 68 and bears against the head thereof and end wall of the block 66. The stem 64 previously described as being movable through the guide plate 65, projects sufficiently through the same so that when the support 48 is in its normal position and the head 69 is held up against the end of the stem 64, there is a space between the head 69 and the guide plate 65 sufficient to carry a wire from which the stays are severed. And it is intended that when the support 48 has been swung in the manner previously described for causing the feed roll 39 to impinge on the wire blank B that the stem 64 will be projected through the guide plate 65 and move the head 69 and its stem 68 against the action of the spring 71, for the purpose of moving the head 69 farther away from the guide plate 65 and from engagement with the wire blank, so that as the feed rolls operate to project the wire across the strands, the gripping devices will not retard the movement of the stay wire blank, but as the spring 67 operates to return the support 48 to its normal position, the spring 71 will operate to cause the head 69 to impinge the wire blank B and firmly hold the same between said head and the guide plate 65 to prevent its movement in either direction.

The sections 57 and 58 of the cam which has been previously described as operating to swing the head 53 on the rock shaft 54, are placed in juxtaposition, as shown in cross section in Fig. 5 and they may be adjustable in the manner shown in Fig. 7 on a head 72 which is secured to the time shaft 12. These cam sections are designed to be adjustable with respect to each other for the purpose of regulating the movement of the stay blank, and thereby the length of stay to be projected across the strand wires. The drawings, particularly Fig. 5, illustrate sufficient mechanism for producing a wire fabric having three intermediate and two marginal wires which are spaced at graduated distances apart. However, it will be understood that the spacing of the strand and marginal wires may be at uniform or at graduated distances apart and that it is optional in building a machine whether the mechanism will only accommodate three intermediate and two marginal wires, or not; depending largely on the width of the machine and the number of wire connecting devices which are provided for connecting the stays to the strands. And it is for the reasons just previously stated, that the cam sections 57 and 58 are adjustable, so that in the event the machine will accommodate a large number of strand wires for the purpose of making a high fence that a low fence may be made equally as well, by simply omitting certain of the strand wires and adjusting the cam sections 57 and 58 so as to hold the arm 55 see Fig. 7 projected outwardly a sufficient length of time to allow the feed rolls 38 and 39 to operate on the stay wire blank for projecting the same across the strands. It will be understood that by separating the cam sections the arm 55 will be held projected outwardly much longer than if the sections were closed.

Adjacent to the heads of the coiling stems 9 there is provided suitable cutting and depressing mechanism for severing the stay wire blanks into sections of stays which are designed to extend across the fabric from one marginal wire to the other. One stay severing device might be deemed sufficient and that to be placed in proximity to the feed, but it is preferable to have two of such devices, one located adjacent to each of said coiling spindles. The object in providing two of such severing devices is that although the same gage of wire be used from which the stay sections are cut, there are times when such wires will vary in size and when it does, it is apparent that the feed rollers 38 and 39 will engage the wire at slightly different points, even though very slight, it will tend to more or less increase or decrease the length of stay sections which is fed across the fabric, and to provide for this, and to guard against any projections after the ends of the stays have been coiled or locked about the marginal wires, there is provided two severing devices and the stay sections are thereby cut into lengths which will be just sufficient to allow their ends to be properly coiled or locked about the marginal wires.

The cutting device above referred to is best seen in Figs. 23 and 24 and 28 and comprises the cutter 73 and the shear 74. The cutter is adjustably carried in the forward ends of a frame 75 which is fulcrumed at 76 on the center point pins 77 suitably carried in lugs 78 secured to or formed a part of the base plate 1. The shear is adjustably connected with the bracket 21 by being secured to said bracket by means of the covering plate 79 and said shear 74 has a longitudinal opening through the same through which it is adapted to carry wire blank B from which the stay sections are cut. By means of an arm 80 which is pivotally connected at one end at 80ª with the frame 75 and at its opposite end at 80ᵇ with a coupling 81 secured to the rock shaft 54, the frame 75 may be suitably oscillated when the shaft 54 is rocked in its bearings for causing the cutter 73 and shear 74 to coöperate in severing a stay length from the blank B when the same has been projected in the manner described, crossing the running wires forming the fabric.

To the frames 75 are attached stay wire depressing means being a bar or plate 82 having the lower bevel face 83. As the frame 75 is oscillated and the shearing members operate to sever a stay length from the wire blank and for trimming its opposite ends, the bevel edges 83 of the depressing plates 82 will engage with the ends of a stay section, and will depress the same downwardly as is shown in Fig. 26 and inwardly as is shown in Figs. 27 and 28. That is to say, the operation of the depressing plates 82 will force the ends of the said sections down, and on to the bevel face of the coiling spindles 19, as shown in Fig. 26 and inwardly, or in the direction in which it is intended that the coiling pins 84 of the coiling spindles 19 will operate to coil or lock the ends of such stay sections about the marginal wires A.

The guides 29 which have been previously referred to, and which are supported directly above the head ends of the coiling spindles 19 and through which the marginal wires A pass, comprise brackets 85 suitably secured to the base plate and having the tubular bodies 86 at their forward ends. In such tubular bodies are suitably carried the tubular stems 87 provided with the vertical slots 88 therein, which communicate with and form a part of a longitudinal groove or slot 89 in an elongated extension 90 of the tubular stem 87. The tubular body 86 of the bracket 85 is provided with a vertical slot 86ª corresponding somewhat to the vertical slot 88 in the tubular stem 87. The outer slotted or grooved end of the elongated extension 90 of the stem 87 is adapted to pass under a block 91 secured to the base plate, which is the normal position of said elongated extension, and for normally holding the said extension in this position, there is provided the spring 92. The marginal wires A pass up through the tubular stems 87 of the guides 29 and the wire blanks B pass below the tubular head 86 and the stem carried therein and into and through the slot or groove 89 in the elongated extension 90 and through suitable guides which will be hereinafter described, which coöperate with the wire connecting devices for securing the stay sections to the intermediate strands and through a similar guide located at the opposite side of the machine. It is understood of course that the guides for the marginal wires are duplicates of each other.

In the operation of pulling out the strand wires, after a stay has been secured (which will be hereinafter described,) the stays are moved sidewise by suitable means, and when so moved, said stays will swing the elongated extensions 90 of the guides 29, by partially rotating the stems therein in the tubular heads 86; this will swing the outer slotted or grooved ends of the extensions 90 from beneath the block 91 as shown in Fig. 29, which will allow the said stay sections to move upwardly with the running wires; such swinging of the extensions 90 being against the tension of the springs 92, which, when the stays have disengaged themselves from the guides, will return them to their normal positions as shown in full lines in the figures. To lock the stems of the guides in the heads 86 and yet permit the same to be partially rotated therein, the bodies of the spindles 87 are provided with the flat faces or grooves 93 cut into the same and the threaded plug 94 which is screwed into the tubular head 86, enters the groove 93. Thus, it will be seen that through such connection, the lug will hold the stem 87 against vertical movement and yet will allow the same to have a partial rotation in the manner described in the tubular heads 86.

The mechanism for connecting the body of the stay sections with the intermediate strand wires where they intersect will now be described. The particular means in this instance is preferably a lock which is made from a continuous wire, bent into the form of a staple, the arcuate portion of which is passed diagonally across the juncture of the two wires and its ends caused to be wrapped or coiled concentrically and partially about one and the same wire on opposite sides of the cross wire to which said first-mentioned wire is secured. As was described, the ends of the stay sections are wrapped or coiled about the marginal wires of the fabric and during the wrapping or coiling of the ends of such stay sections about the marginal wires, it is designed to operate in unison the mechanism which shall connect the intermediate portions of the stay sections to the intermediate wires of the fabric. The mechanism for connecting or attaching one portion of a stay section to an intermediate wire is the same as the means employed for connecting or attaching other portions of the same stay section to the remaining intermediate wires of the fabric, so that the description of the mechanism for connecting one intermediate portion of a stay section to one intermediate strand wire will be sufficient to include corresponding elements of the similar mechanism for connecting other portions of a stay section to the remaining intermediate strands.

It has been described that the strand wires A pass up through slots 26 in longitudinal movable bars 27. The stay blank B which is projected by the feed previously described, across the strands, is fed across and above the bars 27 as best seen in detail in Fig. 10 and also Fig. 21, the last mentioned figure showing the stay sections in a position when the fabric is ready to be drawn out. Intermediate each of the bars 27 through which the strand wires A pass, are slidably supported guides plates 95 provided with a wire groove or slot 96 forming a seat for the wire blank B, through which the same is projected across the machine; these guide-plates 95 are normally held in a position where the grooves or slots 96 thereof are normally in line with the wire grooves or slots 89 in the extensions 90 of the guides, previously described, when such guides are in a position shown in full lines in Fig. 29. Thus, it will be seen that when the stay blank is passed through the extension 90 of the first guide, it will be projected across and through the grooves 96 of the guide plates 95 and is finally passed through the wire grooves or slots in the extension 90 of the guide upon the opposite side of the machine. However, intermediate the guide plates 95 and coinciding with and supported above each of the bars 27 there is provided a stationary receiving die member 97 provided with a wire receiving slot or groove 98 extending transversely in one direction across the acting face of said member through which the wire blank B is passed as the same is projected across the machine and passes through the slots or grooves of the wire guides, above referred to, and coöperating with each of the guide plates 95, which said plates are preferably L-shaped as shown, are guide bars 99 with which portions of the guide plates 95 coöperate, and below which the wire grooves or slots 96 of the guide plates 95 are normally retained, which position will prevent any dislodgment of the stay sections through the operation of connecting the same to the strand wires, and it is impossible to disconnect the said stay sections from such wire grooves until after the guide plates 95 have been moved for the purpose of placing the wire grooves or slots therein outside of the guide bars 99. In the position in which the parts above described, are disposed, which is the position of the parts as they are shown in Fig. 10, the stay section is removed a short distance from the strand wires A, but mechanism will be described which will show how the strand wires through the movement of the bars 27 in one direction are caused to be brought into juxtaposition to the said sections and that portions of the strand wires pressed into a wire groove or slot in the acting face of the member 97, at which time the wires are connected in the manner referred to. The receiving die members 97 have the outer ends of the wire grooves or slots 98 beveled as at 99$^a$, to enable the stay blanks to slip easily into and out of the wire grooves 98 therein. There is also provided in the acting face of the receiving die member 97, a wire receiving groove or slot 99$^b$ which extends transversely in a direction opposite to the wire groove or slot 98, and disposed upon opposite sides of the wire groove or slot 99$^b$ and extending for a short distance and parallel with said groove or slot, are what will be hereinafter termed semi-circular die seats 100, serving a purpose which will be further explained.

The receiving die members 97 are preferably secured on the bed plate 25 beneath a covering plate 100$^a$, see Figs. 6 and 24, for securing the same in position, and should it be deemed desirable to provide an adjusting means for the said receiving dies, the nut 101 is provided which is firmly secured in position at the rear of the receiving die 97, substantially as shown in Figs. 4 and 6, and the screw 102 coöperating with said nut and adapted to engage with the rear end of the receiving dies, serves to adjust the same in the event of wear upon the acting face of the receiving dies. Owing to the fact of constant wear upon the acting face of the receiving dies, and particularly on the semi-circular die seats 100, it is preferable to construct the receiving dies in two separate sections, arranging the groove or slot 99$^b$ and the semi-circular die seats 100 in the front face of a member 103, see Fig. 15, which is secured in the receiving die member 97. With this construction, the section 103 of the receiving die member 97 containing the semi-circular die seats may be replaced, without the necessity of replacing the entire receiving die member.

After the stay section has been placed in a position heretofore indicated, and the parts are in position for the purpose of severing a locking member and locking the same about the stay section and an intermediate wire, with the ends of the said lock partially coiled about said stay section, the rock shaft which has been referred to as 54 will be rocked in its bearings and when so rocked, the bar 27 will, through link connections 104, connecting the rear end of the bar 27 with a member 105 secured to said rock shaft, draw the bar 27 toward the axis of said shaft.

Connected to move with the bars 27 is a block 106 shown in detail in Fig. 16 and said block is provided with a longitudinal opening 107 through the same which has its opposite walls 108 beveled in the manner seen in Fig. 16, and disposed in a plane diagonal to the longitudinal bearing of said block, and 109 denotes a slotted opening extending down into the block at right angles to the longitudinal opening therein and communicated therewith, the end wall of said slotted opening 109 presenting a flat face as at 110. This block performs several different functions, that of one of two cutting members for severing a short section from a continuous wire from which a lock is made; as a guide for the plunger or punch and also coöperates with an anvil for forming the locks and forces the strand wire into the wire groove or slot 99$^b$ of the receiving die, the rear wall or seat of which is indicated as 111 and is convex as shown in Fig. 12 which produces an irregular portion in the strand wire as shown in such figure which insures a perfect lock being made with the stay section when the lock is caused to connect the same through the action of the plunger or punch, which will be described. When the parts are in the position shown in Figs. 9 and 10 of the drawings, just prior to the operation of the rock shaft 54 for reciprocating the bar 27 and with it the block 106, a wire which is indicated as C from which the blanks which thereafter are formed into locks, are severed, is fed diagonally across the front face of the block 106 as shown in Figs. 5, 9 and 10, said wire C passing up and along the line indicated as 112 and upon movement being imparted to the bar 27 and its block 126, the cutting edge 113 of said block cooperating with the     tting edge formed on the outer end of a member 114 through which the wire C is fed, causes a blank suitable for a lock to be severed from the length of wire C. This blank when it is fed as a part of the continuous wire C crosses the front face of the block 106 passing up through a slotted opening 115, in the lower end of an anvil 116, see Fig. 10. This anvil extends down into the slot 109 in the block 106, its lower end engaging with the flat face of the wall 110 of such slot and the lower end of the anvil is beveled at 117 for convenience in the coöperation of said anvil with the plunger or punch, to be hereinafter described, which will release the anvil from the block to allow for its engagement with the blank forming the lock, and force it about the intersecting strand and stay. In the position in which the anvil is shown in Fig. 10, when the bar 27 and the block 106 is moved to the left and the blank is severed from the wire C, the end of the block engaging with said blank will carry the ends forward and bend them over the anvil, in the manner indicated in Fig. 12, shaping said blank into the form of a U being substantially the shape of a staple, and as the end of the block 106 engages with the strand A it will cause the same to impinge upon the stay B and cause it to conform to the shape of the wall 111 of the wire groove or slot 99 in the receiving die 97. Immediately thereafter, the plunger or punch 118, the forward end of which is normally carried in the groove 107 of the block 106 and conforms thereto, will be projected forwardly, by means to be described, and the beveled end 118ª thereof engaging with the bevel end 117 of the anvil 116 will raise the same in the slot 109 of the block 106, releasing said anvil from the wire lock, allowing the end of the plunger or punch to engage therewith, and be carried forwardly with the movement of said plunger or punch and the ends of the wire lock projected diagonally across the juncture of the wires A and B, forcing the arcuate portion of said wire lock against the body of the stay, as shown in Fig. 35, at which time the ends of the wire lock have engaged with the semi-circular die seats 100 in the receiving die 97 and are caused to be concentrically and partially locked about the stay upon opposite sides of the strand. The feed of the wire lock and crossing the juncture of the wires in the manner described, causes the ends thereof to engage at opposite points in the semi-circular die seats 100 and to be locked in opposite directions on the stay wire B.

The operating end of the plunger or punch is shaped to conform to the groove 107 and the walls 108 thereof in the block 106 and the extreme end of said plunger is provided with the concave seat 119 to conform to the arcuate portion of the locking wire as the same is bent into the form of a staple shown in Fig. 12. The plunger or punch has a long shank indicated as 120 which is adjustably secured in a housing or retaining member 121, to one end of which are attached links 122 which in turn are secured to a member 123 connected to a rock shaft 124. Said rock shaft is operated in a manner to be described, for projecting the plunger or punch 118 in the manner described and returning the same after the wire lock has connected the strand to the stay. In Fig. 18 there is shown in detail the manner of adjusting the plunger or punch 119, a screw 125 being employed for locking the shank of the plunger or punch in position in its housing and when released, the plunger or punch may be longitudinally adjusted in its housing by means of the screw 126 which passes through a stud 127, the outer ends of which form a connection for the links 122 with the housing 121 and the body of the stud 127 serves as a nut with which the screw 126 has a threaded engagement. The manner of operating the rock shaft 124 is best seen in Fig. 6, where an arm 128 which is suitably secured to said rock shaft, is provided with the roller 129 on its lower end coöperating with a cam 130, which in one complete revolution with the shaft 12 on which it is carried, will project the plunger or punch 118 forward and return the same. This cam is so timed in its movement with the shaft 12, that the plunger or punch will not be projected until after the bar 27 has moved the block 106 into the position shown in Fig. 12. The movement which is imparted to the rock shaft 54 for operating the bar 27 to move it in the manner described, is through an arm 131 suitably secured to the rock shaft 54 and on its lower end is provided with a roller 32 which rides in a cam groove 133 in the gear 13 previously referred to as attached to the shaft 12, best seen in Fig. 6. The movement of the gear 13 and its cam will operate to move the bar 27 in advance of the movement of the plunger or punch when the same is projected, causing the block 106 to clamp the stay and strand wires between the said block 106 and receiving die 97, crimping the same as shown in Fig. 12, and said cam groove 133 is so constructed (see Fig. 6) that the block 106 will be temporarily held in engaging relation with the stay and strand wires and said receiving die 97, during which period the wire lock is forced around the intersecting portions of the strand and stay wires; and the operation of the cam 130 for imparting movement to the rock shaft is so timed that after a wire lock has been caused to connect a strand to a stay, the plunger or punch will recede just prior to the movement of the bar 27 and its block 106.

The anvil 116 referred to, has a detachable as well as an adjustable connection with an oscillating arm 134, detachable with said arm by means of the bolt 135 and adjustable thereon by means of the bolt 136 (see Fig. 9). The outer end of the arm 134 has a pivotal connection at 137 with a suitable support on the bed to allow for the anvil and its arm being raised upon the engagement of the plunger or punch with the lower end of said anvil, and upon the receding of the plunger or punch, in the manner described, a spring 138 suitably attached to the arm 134 and the bed will return the anvil to the position shown in Fig. 10 immediately upon the plunger or punch moving from beneath the same.

The member 14 previously referred to, through which the wire C is fed and from which blanks are cut, which are thereafter bent into the form of the staple locks, is detachably carried in a diagonally disposed opening 139 in the bed plate 25 and secured by means of the bolt 140, and the wire C in its feed to the member 14 passes through a tube 141, there being one for each of the wires C, and to the inner ends of said tubes 141 are detachably connected caps 142 which have a threaded connection with an extension 143 of the bed plate 25 through which may be inserted the member 114 when the parts are placed in a position as shown in Fig. 9. The tubes 141 extend off to one side of the machine preferably to the side opposite to the feeding in of the wire B from which the stay sections are severed, and the ends of said tubes stop short of a feed which will be described, for feeding in the wire C. 144 denotes a support which is secured to one end of the base plate 1, as best seen in Figs. 1, 3, 5, 32 and 33, and it is in said support that the outer ends of the tubes 141 for the wire C are secured, in the manner seen in Fig. 5, and said tubes 141 preferably lie parallel to each other and spaced a suitable distance apart from each other. The wires C which are fed into the machine parallel with each other, first pass through guides 145 attached to the support 144 and then into the tubes and to the severing and locking device described. The guides 145 are preferably cut away at a point 146 where a pair of coöperating feed rollers 147 and 148 are adapted to be caused to engage with the wire C for feeding the inner ends thereof to the locking devices aforesaid. The feed rollers 148 have a fixed connection with a shaft 149 which is adapted to be driven in a step by step motion through a ratchet wheel 150 attached to said shaft and a pawl 151 adapted to engage with the teeth of said ratchet wheel, which is pivotally connected with the support 152 adapted to be oscillated on the shaft 149 through the connection with said support 152 of a pitman 153 which is connected at its lower end with a lever 154 fulcrumed on one of the pivots 32 above referred to, and in connection with, one of the levers 31, so that the lever 154 moves in unison with the lever 31 as said lever is oscillated through the action of the cam 30 on the shaft 12. Thus, with each complete revolution of the shaft 12, the pawl 151 through the connections just described with said shaft 12 will be moved for the purpose of rotating the shaft 149 a sufficient distance to cause the feed rollers 148 in conjunction with corresponding feed rollers 147 to feed in so much of the wires C engaged thereby from which a blank may be cut in the manner previously described for forming a staple lock.

The feed for the wire C is so arranged that any one of the feed rollers 147 may be cut out of service, so that only certain of the wires C will be fed to the wire connecting devices for the intermediate strands. To do this, the feed rollers 147 are made in the form of annular rings, as shown in Fig. 33, each having internal gearing 155, which are designed to mesh with the teeth of a pinion 156 carried upon an eccentrically disposed shaft 157. The rollers 147 have frictional engagement with a depressible block 158 slidably carried in a housing 159 which forms a part of or may be attached to the support 144. For each of the blocks 158 there is provided an overlying yielding bar 160, which bars are suitably disposed in the housing 159, the opposite ends of which are suitably disposed in grooves 161 of guide bars 162 supported in the housing. These guide bars 162 are suitably provided with threaded portions 163 with which screws 164 have connection and the lower ends of said screws are adapted to act upon the ends of the yielding bars 160, as shown in Fig. 33. The operation of such parts may be better explained as follows: When it is desired to have one or more of the feed rollers 147 in coöperation with coinciding feed rollers 148, an operator will screw down one of the screws 164 for the purpose of depressing the yielding bar 160 with which it engages, as shown in Fig. 33, and it acting upon the depressible block 158 will cause it to force its feed roller 147 to firmly impinge upon a wire C passing between it and its corresponding feeding roller 148. The shaft 149 on which the feed rollers 148 are carried, being operated by the ratchet and pawl in the manner above described, will impart motion to the eccentrically disposed shaft 157 through the gear 165 carried on the shaft 149 and the gear 166 on the eccentrically disposed shaft meshing with the gear 165, which will impart motion to the internal gear of the feed roller 147, which is being depressed, and the action of the rollers 147 and 148 thus arranged, will project the wire C inward sufficiently to provide for the cutting therefrom of wire blanks for a staple lock. Releasing any one of the screws 164 to relieve the pressure on the yielding bar 160, will in turn relieve the pressure on the depressible block 158 and allow the feed roller 147 to run loose, so that the operation of the shafts 149 and 157 will not affect the feed rollers thus arranged and they will be inoperative so far as their being able to project the wire C coinciding with the same to its corresponding locking devices aforesaid; although any motion which is imparted to the shaft 157 will naturally be imparted to the feed rollers 147. The arrangement of the eccentrically disposed shaft 157, its pinions 156 and the internal gearing of the feed roller 147 is such that the roller may have slight vertical motion without in any way affecting the connection of the gearing between the feed or roller and the eccentrically disposed shaft.

Upon the operation of the rock shaft 54 subsequent to the withdrawal of the plunger or punch 118 in the manner described, the bar 27 in operative connection with the rock shaft 54, as has been described, will be returned to its normal position, being that position seen in Fig. 1, and the wall of the slot 26 therein will force the strand wires A out of the receiving die and in so doing, by reason of the lock of the stay and strand, will carry the stay with the strand. Such movement of the said stay will move the guide plate 95 outwardly against the action of the coil springs 167, which movement will place the guide plate 95 in the position shown in Fig. 21 and the extension 90 of the guide 87 in the position shown in dotted lines in Fig. 29, placing the stay in a position where it may free itself from the wire grooves or slots in which the same has been temporarily retained, so that as the fabric is drawn out in the manner previously described, the stay will be free to move with the strand wires of such fabric. The springs 167 are coiled about a stem 168 which has slidable connection in a block 169 suitably secured to the bed of the machine, so that when the stay has been disengaged from the wire groove or slot in the guide 95 in which it has been carried, the springs 167 will return the guide plates 95 to their normal position, ready to again receive a stay section which may be projected across the machine in the manner described.

What is claimed is:—

1. In a wire fence machine, the combination of a stationary die-receiving-member, provided with transverse wire grooves, and with a plurality of semi-circular die-seats disposed upon opposite sides and parallel with one of said grooves, a block movable toward and from said member and provided with a longitudinal opening, and a punch movable through the opening in said block and having its free end provided with a concave seat.

2. In a wire fence machine, the combination of a stationary die-receiving-member, provided with transverse wire grooves and with a plurality of semi-circular die-seats disposed upon opposite sides and parallel with one of said grooves, a block movable toward and from said member, provided with a longitudinal opening central of said block and a slotted opening in said block, a punch movable through the opening in said block, and an anvil normally extending down into the slot of said block and capable of being raised when the punch moves in the block.

3. In a wire fence machine, the combination of a stationary die-receiving-member, provided with transverse wire grooves, and with a plurality of semi-circular die-seats disposed upon opposite sides and parallel with one of said grooves, a block movable toward and from said member, provided with a central longitudinal opening having beveled side walls, and a slot extending into said block, a punch movable through the block and shaped to conform to the opening therein and having in its free end a concave seat, and an anvil normally extending down into the slot of the block, provided with a slotted end, and capable of being raised when the punch moves in the block.

4. In a wire fence machine, the combination of a stationary die-receiving-member provided with transverse wire grooves and a pair of concave die-seats parallel with one of said grooves, means for passing the bodies of strands and stay wires across and in front of the grooves of the member, a slidably supported block capable of forcing the wires aforesaid into the grooves of the member, means for feeding a wire blank across one end of the block, means for severing said blank as the block moves toward the member, means for bending the blank during the movement of the block, and a punch movable in the block, capable of engaging with the blank to move it to the member and force the ends of said blank against the die seats therein and cause the ends thereof to be locked about one of said first mentioned wires.

5. In a wire fence machine, means for feeding a strand wire, means for feeding a stay wire across the strand, means for feeding a wire blank from which a lock may be severed, a movable part for severing the lock from the blank and during its movement bend the lock, a stationary part adapted to receive the strand and stay wires, and a reciprocal member adapted to engage the lock and force it across the juncture of the stay and strand, and through the engagement of the ends of the lock with the stationary part said ends will be locked about one of said first mentioned wires.

6. In a wire fence machine, means for feeding a series of strand wires, means for feeding a stay wire across said strands, means for feeding a series of wire blanks from each of which a lock may be severed, a series of movable parts for severing the locks from the blanks and during their movement bend each of said locks, a stationary member in line with each of said movable parts adapted to receive the strand and stay wires, a reciprocal member adapted to engage each of the locks to force the same across the junctures of the stay and strands, and through the engagement of the ends of the said locks with each of said stationary parts, the ends of the locks will be locked about one of said first mentioned wires, in combination with means for coiling the ends of the stay about each of the outside strand wires.

7. In a wire fence machine, means for feeding a strand wire, means for feeding a stay wire across the strand, means for feeding a wire blank diagonally across the line of intersection of the stay and strand, from which a lock may be severed, an anvil provided with a slot through which the wire blank projects, a movable part for severing the lock from the blank and during its movement bend the lock, a stationary member adapted to receive the stay and strand wires, and a reciprocal member adapted to engage the lock and force it across the juncture of the stay and strand, and through the engagement of the ends of the lock with the stationary part, said ends will be locked about one of said first mentioned wires.

8. In a wire fence machine, means for feeding a strand wire, means for feeding a stay wire across the strand, means for feeding a wire blank diagonally across the line of intersection of the stay and strand from which a lock may be severed, an anvil provided with a slot through which the wire blank projects, a movable part for severing the lock from the blank and in conjunction with the anvil bending said lock into a suitable form, a stationary part having a wire groove for the strand and stay wires, and a reciprocal member adapted in its forward movement to release the anvil from the lock and to engage said lock and cause it to straddle the stay and strand wires and force the ends of the said lock against the stationary part, which engagement will cause the ends of the lock to be locked about one of said first mentioned wires.

9. In a wire fence machine, a stationary part provided with transverse wire grooves, means for feeding a strand wire in front of one of said grooves, means for feeding a stay wire through the other of said grooves, means for feeding a wire blank diagonally across the line of intersection of said strand and stay, means for severing a lock from the blank and bending the same into suitable form, said means also capable, immediately upon severing said lock, to force the strand wire into its groove in the stationary part and bend the same over the stay, and means for engaging the lock and passing the ends thereof diagonally across the juncture of the stay and strand and force the ends thereof to be locked about one of said first-mentioned wires.

10. In a wire fence machine, a stationary part provided with transverse wire grooves and with a pair of die-seats, means for feeding a strand wire across and in front of one of said grooves, means for feeding a stay wire across and in front of the other of said grooves, means for projecting a wire across the intersection of the stay and strand, means for severing a short section from said last mentioned wire, thereafter bending it into the form of a staple and at or about the time of the formation of said staple, capable of forcing the strand and stay wires into the transverse grooves of the stationary part, and means for engaging the arcuate portion of said staple and projecting the same over the juncture of the stay and strand, causing the ends of said staple to engage with the die-seats of the stationary part which will force the ends of said staple about one of said first mentioned wires.

11. In a wire fence machine, a stationary part provided with transverse wire grooves, means for feeding a strand wire in front of one of said grooves, means for feeding a stay wire through the other of said grooves, means for feeding a wire blank diagonally across the line of intersection of said strand and stay, means for severing a lock from the blank and bending the same into suitable form, said means also capable, immediately upon severing said lock, to force the strand wire into its groove in the stationary part, and means for engaging the lock and passing the ends thereof diagonally across the juncture of the stay and strand and force the ends thereof to be locked about one of said first mentioned wires.

12. In a wire fence machine, the combination of a stationary part provided with transverse wire grooves and a plurality of die-seats, a block provided with a longitudinal opening and a slot extending down into the block and communicating with said opening, a reciprocal bar supporting said block, a rock-shaft and connections between said rock-shaft and bar, a pivotally supported anvil projecting down into the slotted opening in said block, a punch adapted to have a reciprocal movement through the longitudinal opening in the block, a rock-shaft, and connections between said rock-shaft and said punch.

13. In a wire fence machine, the combination of a stationary part provided with transverse wire grooves, a plurality of die-seats, a block provided with a longitudinal opening and a slot extending down into the block and communicating with said opening, a reciprocal bar supporting said block, a pivotally supported anvil projecting down into the slotted opening in said block, a punch adapted to have a reciprocal movement through the longitudinal opening in the block, means for reciprocating the bar and advancing the block toward the stationary part, means for reciprocating the punch toward the stationary part and through its movement lift the anvil, said means for reciprocating said punch also returning it in advance of the return movement of the block.

14. In a wire fence machine, the combination of a stationary part provided with transverse wire grooves and a plurality of die-seats, a block provided with a longitudinal opening and a slot extending down into the block and communicating with said opening, a reciprocal bar supporting said block and provided with a transverse opening therethrough in front of said block, a rock-shaft and connections between said rock-shaft and bar, means for feeding a strand wire through the opening in the bar and in front of said block and one of the grooves in said stationary part, means for feeding a stay wire through the other of said grooves in the stationary part, a pivotally supported anvil projecting down into the slotted opening in said block and provided with a slot in its lower end, means for feeding a wire blank diagonally across the end of the block and through the slot in the anvil, a punch adapted to have reciprocal movement through the longitudinal opening in the block, a rock-shaft, and connections between said rock-shaft and said punch.

15. In a wire fence machine, the combination of a stationary part provided with transverse wire grooves and a plurality of die-seats, a block provided with a longitudinal opening, and a slot extending down into the block and communicating with said opening, a reciprocal bar supporting said block, and provided with a transverse opening therethrough in front of said block, means for feeding a strand wire through the opening in the bar, and in front of said block, and one of the grooves in said stationary part, means for feeding a stay wire through the other of said grooves in the stationary part, a pivotally supported anvil projecting down into the slotted opening in said block, and provided with a slot in its lower end which is normally in line with the forward end of said block, means for feeding a wire blank diagonally across the end of the block and through the slot in the anvil, means for reciprocating the bar and block and during such movement sever a section from the wire blank and bend said section into the form of a staple on the anvil, the continued movement of the block forcing the strand wire into its groove in the stationary part and across the stay, a punch adapted to have a reciprocal movement through the longitudinal opening in the block, means for reciprocating said punch, the forward motion of said punch in the block raising the anvil to release it from the staple and engaging said staple projecting it to the stationary part and across the juncture of the stay and strand, the ends of said staple engaging with the die-seats in the stationary part which forces them about one of said first mentioned wires.

16. In a wire fence machine, the combination of a bed-plate, a die-receiving member fixedly supported on said bed-plate, a reciprocally supported bar mounted on the bed-plate to have movement beneath the receiving member, a block attached to said bar and provided with a longitudinal opening, and a slot extending diagonally down into the same, an anvil extending down into the slot of the block and having a slot which is normally disposed in line with the end of the block, means for feeding a strand wire up through the bar, means for feeding a stay wire across and above the bar, means for feeding a wire blank across the end of the block and through the slot in the anvil, means for moving the bar and with it the block, the latter severing a section of wire from the blank and bending the wire into the form of a staple on the anvil, a punch coöperating with said die-receiving member for locking the staple on the stay and strand at their point of intersection, and means for actuating the said punch.

17. In a wire fence machine, the combination of a bed-plate, a plurality of spaced reciprocating bars each having a transverse slot, means for feeding strand wires through the slots of the bars, a stationary part mounted above each of said bars and provided with suitable grooves, means for feeding a stay wire across and above the bars and through one of the grooves in the stationary parts, movably supported guides for said stay intermediate said bars, a block attached to each of said bars, a movably supported anvil having a slotted end projecting down into each of said blocks, means for feeding wire blanks across the ends of the blocks and through the slots of the anvils, means for simultaneously actuating each of said bars and with them their blocks, the latter severing sections of wires from the blanks and bending them on the anvils in the shape of staples, and means movable through said blocks, adapted to release the anvils from the staples and engaging the staples force them across the intersecting points of the stays and strands and through the engagement of the ends of the staples with the stationary part causing such ends to be locked about one of said first mentioned wires.

18. In a wire fence machine, a stationary part provided with transverse wire grooves and a pair of concave die-seats, means for feeding a strand wire in front of one of said grooves, means for feeding a stay wire through the other of said grooves, means for feeding a wire blank diagonally across the line of intersection of said strand and stay, means for severing a lock from the blank and bending the same into the form of a staple, said means also capable, immediately upon severing said block to force the strand wire into its groove in the stationary part and against the stay, and means for engaging the staples and forcing the same across the intersection of the strand and stay, such movement also causing the ends of the staple to engage opposite sides in the concave seats of the stationary part and be locked concentrically in opposite directions about the stay.

19. In a wire fence machine, means for feeding a series of strand wires, an intermittent feed for advancing a stay wire blank across the strand, means for severing a stay length from the blank, means for coiling the ends of the stay around the outside strand wires of the series, a stationary die-receiving-member disposed at the intersection of the stay with each intermediate strand wire, means for feeding a wire to the intersection of the stay and the intermediate strands, means for severing a section from each of said last mentioned wires, means for bending the said sections of wires into the form of a staple immediately upon their being severed, and means for engaging each staple and projecting it across the intersection of the stay and each intermediate strand, causing the ends of the staple to engage with the die-receiving-members, and through such engagement be locked about said stay.

20. In a wire fence machine, a feed for a stay wire blank, comprising a constantly driven disk, a second disk journaled on an oscillating support, means for moving said second disk to coöperate with the first disk in engaging and feeding a wire, and means for returning said second disk to its normal position.

21. In a wire fence machine, a feed for a stay wire blank, comprising a disk mounted on a member journaled in a fixed support, means for constantly driving said disk, a second disk, a movable support for said second disk, means for moving said second disk to coöperate with the first disk in engaging and feeding a wire, and means for returning said second disk to its normal position.

22. In a wire fence machine, a feed for a stay wire blank, comprising a disk journaled in an immovable support, a driving shaft, and connections between said shaft and said disk, a second disk journaled in a movable support, intermittently actuated means for moving said second disk into a position to coöperate with said first disk to engage and feed a wire, and means operating at predetermined intervals for moving said second disk from said first disk.

23. In a wire fence machine, a feed for a stay wire blank, comprising a disk journaled in an immovable support, a driving shaft, gearing connecting said driving shaft with said disk, an oscillating support, a second disk journaled in said support, means for feeding a wire between the peripheral face of said disk, means for moving said oscillating support to cause its disk to impinge upon the wire between the two disks and means for moving said oscillating support to separate the disks.

24. In a wire fence machine, the combination with a feed for a stay wire blank, a gripping device for engaging such wire, a feed for intermittently advancing such wire, comprising a constantly driven disk, a second disk adapted to have movement toward and from said constantly driven disk, means for moving said second disk, toward the constantly driven disk and simultaneously release the gripping device from the wire, and means for moving said second disk to its normal position and simultaneously operate the gripping device to engage the wire.

25. In a wire fence machine, the combination with a feed for a stay wire blank, a gripping device for engaging such wire, a feed for intermittently advancing such wire, comprising a disk, means for constantly driving said disk, a movable support, a second disk journaled on said support, means for moving said support disk toward the first disk, whereby a stay wire blank may be engaged between said disks; means operated by said support for releasing the gripping device from the wire, means for returning the support and its disk to its normal position and for simultaneously causing the gripping device to engage the said wire blank.

26. In a wire fence machine, the combination of a coiling spindle, means for feeding a strand wire through said spindle, means for feeding a stay wire blank across the spindle, means for severing a stay length from said blank, and means adapted upon the severing of said stay from the blank, to depress the end of the stay on to the spindle.

27. In a wire fence machine, the combination of a coiling spindle, means for feeding a strand wire through the spindle, means for feeding a stay wire blank across the spindle, a shear, a cutter coöperating with said shear, for severing a stay length from the blank, and means coöperating with said cutter for depressing the end of the stay on to the spindle and in the direction of rotation of said spindle.

28. In a wire fence machine, the combination of a coiling spindle, a movable wire guide above said spindle, means for feeding a strand wire through the spindle and the said guide, means for feeding a stay wire blank across the spindle and through said guide, means for severing a stay length from the blank and means for depressing the end of the stay down on to the spindle immediately upon its being severed from the blank.

29. In a wire fence machine, the combination of a coiling spindle, means for feeding a strand wire through said spindle, means for feeding a stay wire across the spindle, a shear, an oscillating support, a cutter carried by said support adapted to coöperate with said shear, for severing a stay length from the stay wire, a rock shaft and connections between the rock shaft and said oscillating support, means for depressing the end of the stay on to the spindle immediately upon the stay being severed from the blank.

30. In a wire fence machine, a wire feed, comprising a shaft, a plurality of feeding members on said shaft, means for rotating said shaft in a step by step movement, a plurality of feeding members, capable of coacting with said first mentioned members for engaging wires fed between the same, and means for adjusting either of said last mentioned members to prevent concurrent action of said adjusted members and the members with which they coöperate.

31. In a wire fence machine, a wire feed, comprising a shaft, a plurality of feeding members on said shaft, means for rotating said shaft in a step by step movement, a second shaft, a plurality of feeding members on said shaft, each capable of coacting with said first mentioned members for engaging wires fed between the same, and means for adjusting either of the members on said second shaft, to prevent concurrent action of the same and the members with which they coöperate.

32. In a wire fence machine, a wire feed, comprising a shaft, a plurality of feeding members on said shaft, means for rotating said shaft, a second shaft, means for operating said shaft from the first mentioned shaft, a plurality of feeding members on said second shaft, and means for moving any or all of said members on said second shaft to a position whereby they coöperate with said first mentioned members in feeding a wire or wires.

33. In a wire fence machine, a wire feed, comprising a shaft, a plurality of feeding members on said shaft, a ratchet and pawl connection for rotating said shaft, a second shaft, a plurality of feeding members on said shaft adapted to coöperate with said first mentioned members for advancing wires fed between the same, and gearing connecting said shafts.

34. In a wire fence machine, a wire feed, comprising a shaft, a plurality of feeding members on said shaft, a driving shaft, a ratchet and pawl connection between said shafts, a second shaft, a plurality of feeding members on said second shaft, and gearing connecting said last mentioned members with said second shaft.

35. In a wire fence machine, a wire feed, comprising a shaft, a plurality of feeding members on said shaft, means for intermittently operating said shaft, a second shaft, a plurality of feeding members adapted to coöperate with said first mentioned members for advancing wires and provided with internal gearing, means for operating said second shaft, and gearing connecting the internal gearing of said members with said second shaft.

36. In a wire fence machine, a wire feed, comprising a shaft, a plurality of feeding rollers on said shaft, a second shaft, means for operating said shaft, and a plurality of feeding rollers on said second shaft, the axes of which are eccentric to said shaft.

37. In a wire fence machine, a wire feed, comprising a shaft, a plurality of feeding rollers on said shaft, means for operating said shaft, a second shaft, a plurality of feeding rollers on and eccentric to said second shaft, and means for each of said rollers for depressing the same to cause concurrent action of coöperating rollers on both of said shafts for advancing wires.

38. In a wire fence machine, a wire feed, comprising a plurality of feeding rollers, means for intermittently operating said rollers, a plurality of feeding rollers mounted above said first mentioned rollers, a block for each of said last mentioned rollers, serving as a bearing for the same, means for depressing any or all of said blocks for the purposes specified, and means for operating said last mentioned rollers.

39. In a wire fence machine, a feed for a stay-wire-blank, comprising a constantly driven disk, a movably supported disk capable of coöperating with said constantly driven disk for advancing a wire blank, means for advancing said second disk toward the first disk, said means embodying mechanism adapted to be adjusted for regulating the period of time in which said movable disk should remain in coöperation with the constantly driven disk.

40. In a wire fence machine, a feed for a stay-wire-blank, comprising a constantly driven disk, a movably supported disk, capable of coöperating with said constantly driven disk for advancing a wire blank, a rock-shaft, means carried by said shaft for moving said movably carried disk toward the constantly driven disk, an arm depending from said shaft, and adjustable means with which said arm engages.

41. In a wire fence machine, the combination of two shafts, a plurality of feed rollers on each shaft, the rollers on one shaft having a fixed connection with the same, the rollers on the other shaft, while operating in unison with said shaft, capable of being adjusted transverse of the shaft for making the same inoperative as a feed.

42. In a wire fence machine, a plurality of feed rollers arranged in pairs one above the other, means for operating the lower rollers, means for operating the upper rollers, and means for adjusting each of said upper rollers without affecting their driving relation with their carrying shaft, but at the same time making them inoperative as feeding rollers.

43. In a wire fence machine, the combination of means for feeding marginal wires and intermediate strand wires, mechanism for projecting a wire across said marginal and intermediate wires from which a stay blank is severed, severing devices for said stay blank, located adjacent to said marginal wires, coiling members for wrapping the stays about the marginal wires, means for feeding a wire blank diagonally across the points of intersection of said stays and intermediate wires, means for severing a section from each of said last-mentioned wires, and die mechanism for forming said sections of wire into staples and locking said staples about the intersecting stay and intermediate wires.

44. In a wire fence machine, the combination of means for feeding marginal and intermediate strand wires, driving and driven feed rolls coöperating intermittently to project a wire across said marginal and intermediate wires from which a stay blank is severed, straightening devices between which said last-mentioned wire is fed, severing devices for said stay blank, located adjacent to said marginal wires, coiling members for wrapping the stays about the marginal wires, means for feeding a wire blank diagonally across the points of intersection of said stays and intermediate wires, means for severing a section from each of said last-mentioned wires, and die mechanism for forming said sections of wire into staples and locking said staples about the intersecting stay and intermediate wires.

45. In a wire fence machine, the combination of means for feeding marginal wires and intermediate strand wires, mechanism for projecting a wire across said marginal and intermediate wires from which a stay blank is severed, severing devices for said stay blank, located adjacent to said marginal wires, coiling members for wrapping the stays about the marginal wires, means for depressing the ends of the stays across said coiling members, means for feeding a wire blank diagonally across the points of intersection of said stays and intermediate wires, means for severing a section from each of said last-mentioned wires, and die mechanism for forming said sections of wire into staples and locking said staples about the intersecting stay and intermediate wires.

46. In a wire fence machine, the combination of means for feeding marginal and intermediate strand wires, driving and driven feed rolls coöperating intermittently to project a wire across said marginal and intermediate wires from which a stay blank is severed, severing devices for said stay blanks, located adjacent to said marginal wires, coiling members for wrapping the stays about the marginal wires, means for depressing the ends of the stays across said coiling members, means for feeding a wire blank diagonally across the points of intersection of said stays and intermediate wires, means for severing a section from each of said last-mentioned wires, and die mechanism for forming said sections of wire into staples and locking said staples about the intersecting stay and intermediate wires.

47. In a wire fence machine, the combination of means for feeding marginal and intermediate wires, mechanism for projecting a wire across said marginal and intermediate wires from which a stay blank is severed, severing devices for said stay blank, located adjacent to said marginal wires, coiling members for wrapping the stays about the marginal wires, mechanism for feeding a wire blank diagonally across the points of intersection of said stays and intermediate wires, means for severing a section from each of said last-mentioned wires, die mechanism for forming said sections of wire into staples and locking said staples about the intersecting stay and intermediate wires, a time shaft, gearing for operating said coiling members from said time shaft, and means also operated from said time shaft for actuating said feeding mechanism for said diagonally fed wires.

48. In a wire fence machine, the combination of means for feeding marginal and intermediate wires, an operating shaft and a time shaft, driving and driven feed rolls cooperating intermittently to project a wire across said marginal and intermediate wires from which a stay blank is severed, connections between said operating shaft and said driving rolls, means operated by said time shaft for moving said driven roll to a position to coöperate with said driving roll, coiling members for wrapping the stays about the marginal wires, mechanism for feeding a wire blank diagonally across the points of intersection of said stays and intermediate wires, means for severing a section from each of said last-mentioned wires, die mechanism for forming said sections of wire into staples and locking said staples about the intersecting stay and intermediate wires, and means for operating said coiling members from said time shaft.

49. In a wire fence machine, the combination of means for feeding marginal and intermediate wires, an operating shaft and a time shaft, driving and driven feed rolls coöperating intermittently to project a wire across said marginal and intermediate wires from which a stay blank is severed, connections between said operating shaft and said driving rolls, means operated by said time shaft for moving said driven roll to a position to coöperate with said driving roll, coiling members for wrapping the stays about the marginal wires, mechanism for feeding a wire blank diagonally across the point of intersection of said stays and intermediate wires, means for severing a section from each of said last-mentioned wires, die mechanism for forming said sections of wire into staples and locking said staples about the intersecting stay and intermediate wires, means for operating said coiling members from said time shaft, and means also operated from said time shaft for actuating the feeding mechanism for said diagonally fed wires.

50. In a wire fence machine, the combination of means for feeding marginal and intermediate wires, an operating shaft and a time shaft, driving and driven feed rolls coöperating intermittently to project a wire across said marginal and intermediate wires from which a stay blank is severed, connections between said operating shaft and said driving rolls, means operated by said time shaft for moving said driven roll to a position to coöperate with said driving roll, severing devices for said stay blank, located adjacent to said marginal wires, coiling members for wrapping the stays about the marginal wires, means for depressing the ends of the stays across said coiling members, mechanism for feeding a wire blank diagonally across the points of intersection of said stays and intermediate wires, means for severing a section from each of said last-mentioned wires, die mechanism for forming said sections of wire into staples and locking said staples about the intersecting stay and intermediate wires, means for operating said coiling members from said time shaft, means also operated from said time shaft for actuating said die mechanism, and means also operated from said time shaft for actuating the feeding mechanism for said diagonally fed wires.

51. In a wire fence machine, in combination, a wire-receiving member, an endwise movable wire-bending or staple forming member provided with a groove extending longitudinally therethrough its full length, and a punch disposed in the groove of said bending member and movable therethrough.

52. In a wire fence machine, in combination, a wire-receiving member, an endwise movable wire-bending member provided with a groove extending longitudinally therethrough from end to end and having its wall slotted for a portion of its length, an anvil operating through the slot in the wall of said member, and a punch disposed in the groove of said bending member and movable therethrough.

53. In a wire fence machine, in combination, a wire-receiving member having a fixed position and provided with wire grooves in its acting face, an endwise movable wire-bending member adapted following the bending operation to coöperate with the receiving member for the purpose of clamping wires in the grooves in the acting face of said receiving member, said bending member provided with a groove extending longitudinally therein from end to end, and a punch having longitudinal movement through the groove of said bending member.

54. In a wire fence machine, in combination, a wire-receiving member having a fixed position and provided with transverse wire receiving grooves, means for feeding a stay wire through one of the grooves in said member, means for feeding a strand wire crosswise of the stay and removed a short distance therefrom, a reciprocally mounted wire bending member adapted, following the bending operation, to engage and move the strand wire and lock it against the stay in said receiving member, said bending member provided with a groove extending longitudinally therethrough from end to end, and a punch movable longitudinally through the groove of the bending member.

55. In a wire fence machine, in combination, a wire-receiving member, a wire bending member movable toward and from said receiving member and adapted, following its bending operation to clamp a stay and a strand wire, disposed transverse to each other across the acting face of said receiving member, between said bending and receiving members, said bending member provided with a groove extending longitudinally therethrough from end to end, means for feeding a wire across the acting end of said bending member from which said bending member is adapted to cut and form a staple blank, and a punch disposed in a groove of said bending member and movable longitudinally therethrough for the purposes described.

56. In a wire fence machine, in combination, a member having wire grooves in one end, means for feeding wires transversely to each other across the face of said member, a tubular wire bending or staple forming member movable toward and from said grooved member, means for feeding a wire obliquely across the acting end of said bending member, and a punch disposed in and operable through said bending member, immediately following its bending operation.

57. In a wire fence machine, in combination, a wire receiving member, a tubular wire bending member reciprocally mounted in front of said receiving member and having a slot in its wall, an anvil adapted to extend through the slot in the bending member and to coöperate with said bending member during the movement of the bending member to bend a wire, and a punch movable through the bending member and adapted during its movement therein to engage and force the anvil outwardly.

58. In a wire fence machine, in combination, a wire-receiving member provided with wire grooves in its acting face, a reciprocally mounted staple cutting and bending member provided with a groove extending longitudinally therethrough and with a slot in its wall, means for feeding a wire obliquely across the cutting end of said bending member from which a staple is formed, means projecting into the slot of said bending member, with which said bending member coöperates as it severs a staple blank and forms the blank into a staple, and a punch movable through the bending member for engaging and moving the staple endwise.

59. In a wire fence machine, in combination, a receiving-die-member provided with suitable grooves in its acting face, a member movable toward and from the receiving-die-member adapted to position a strand wire in the die member and sever a tie-wire from a tie-wire stock during its movement, and a punch adapted to act upon the tie-wire.

60. In a wire fence machine, in combination, a receiving-die-member provided with suitable grooves in its acting face, a member movable toward and from the receiving-die member and adapted to position a strand wire in the die-member and sever a tie-wire from a tie-wire stock during its movement, said member having a longitudinal opening, and a punch operable in the opening of said member and provided with a tie-wire seat on its free end.

61. In a wire fence machine, in combination, a receiving-die-member, provided with suitable grooves in its acting face, a member movable toward and from said receiving-die-member and adapted to position a strand wire in the die member and sever a tie wire from a tie-wire-stock during its movement, said member having a slotted opening extending into its body, a punch in operative relation with said slotted member, and an oscillatory member operating in the slot of the member and adapted to be engaged by said punch and moved, during the movement of the punch.

62. In a wire fence machine, in combination, a member having a longitudinal opening therethrough, means for feeding a wire obliquely across said member, an anvil over which the wire is bent, means for moving the member to adapt said member to sever a wire blank from said wire and for bending the blank over said anvil, and a punch movable through the member and adapted to engage and move said bent wire blank longitudinally of said member.

63. In a wire fence machine, in combination, a member having a longitudinal opening therethrough, said opening communicating with a slotted opening which opens out of one side of said member, an anvil having movement in said slotted opening of the member, means for moving the member relatively to said anvil, and a punch operable through the longitudinal opening in the member and adapted to engage and move said anvil.

64. In a wire fence machine, in combination, a member having a longitudinal opening therethrough, said opening communicating with a slotted opening which opens out of one side of said member, means for feeding a wire obliquely across one end of said member, an anvil having movement in said slotted opening of the member and over which said wire is adapted to be bent, means for moving the member relatively to said anvil, and a punch operable through the longitudinal opening in the member, and adapted to engage and move said anvil.

65. In a wire fence machine, in combination, a member having an opening longitudinally thereof and which also opens out of one side of said member, means for feeding a wire obliquely across one end of said member, an anvil having movement in said slotted opening of the member and over which said wire is adapted to be bent, means for moving the member to adapt said member to sever a wire blank from said wire and for bending the blank over said anvil in the opening of the member, means for moving the member relatively to said anvil, and a punch adapted to be moved in the opening of the member and during such movement adapted to engage and free the anvil from the formed wire blank and to subsequently engage such blank and push it out of said member.

66. In a wire fence machine, in combination, an elongated rectangular member having a longitudinally disposed slotted opening, opening out of said member in a direction oblique to the longitudinal axis thereof, means for feeding a wire across one end of said member, means for feeding a wire obliquely across said member and in a direction transverse to the obliquely disposed opening in said member, an anvil movable in the opening of said member over which the wire is adapted to be bent, means for moving the member to adapt said member to sever a wire blank from said wire and for bending the blank over said anvil, and means movable longitudinally of said member for engaging the anvil to release it from said wire blank.

67. In a wire fence machine, in combination, an elongated rectangular member having a longitudinally disposed slotted opening, opening out of said member in a direction oblique to the longitudinal axis thereof, means for feeding a wire across one end of said member, an anvil movable in the opening of said member, over which the wire is adapted to be bent, means for moving the member to adapt said member to sever a wire blank from said wire and for bending the blank over said anvil, said anvil being stationary during the movement of the member, and a punch adapted to be moved in the opening of the member and during such movement, adapted to engage and free the anvil from the formed wire blank and to engage said wire blank and move it longitudinally of said member.

68. In a wire fence machine, in combination, an elongated rectangular member having a longitudinally disposed slotted opening, opening out of said member in a direction oblique to its longitudinal axis, means for feeding a wire obliquely across one end of said member in a direction transverse to the obliquely disposed opening in said member, an anvil movable in the opening of said member over which the wire is adapted to be bent, means for moving the member to adapt said member to sever a wire blank from said wire and for bending the blank over said anvil in the opening of the member and during such movement adapted to engage and free the anvil from the formed wire blank and to subsequently engage such blank and push it out of said member.

69. In a wire fence machine, in combination, a movable member having a longitudinal opening therethrough and a slotted opening communicating with said longitudinal opening, which said slotted opening is disposed obliquely to the longitudinal axis of said member, a movable anvil having a portion extending down into said obliquely disposed slot of the member, the end of the portion of the anvil in the member being cut out to receive a wire, means for feeding a wire through the cut out portion in said member, means for moving the member to adapt it to bend said wire over said anvil, and means for moving the anvil to release it from the formed wire, said releasing means adapted to subsequently engage said formed wire.

70. In a wire fence machine, in combination, a movable member having a longitudinal opening therethrough and a slotted opening communicating with said longitudinal opening, which said slotted opening is disposed obliquely to the longitudinal axis of said member, a movable anvil having a portion extending down into the said obliquely disposed slot of the member, the end of the portion of the anvil in the member being cut out to receive a wire, and such cut out portion of the anvil normally coinciding with one end of said member, means for feeding a wire across the end of the member and through the slot in the anvil, means for moving the member to adapt it to bend said wire over said anvil, and means for moving the anvil to release it from the formed wire, said releasing means adapted to subsequently engage said formed wire.

71. In a wire fence machine, in combination, a movable member having a longitudinal opening therethrough and also a slotted opening communicating with said longitudinal opening, said slotted opening being disposed obliquely to the longitudinal axis of said member, a movable anvil having a portion extending down into the said obliquely disposed slot of the member, the end of the portion of the anvil in the member being cut out to receive a wire and such cut out portion of the anvil normally coinciding with one end of said member, means for feeding a wire across the end of the member and through the slot in the anvil, means for moving the member across the anvil to adapt it to bend said wire over said anvil into the form of a staple, and means movable in the longitudinal opening of the member and adapted to engage and release the anvil from the formed staple, said releasing means being adapted to engage the arcuate portion of the staple and to push said staple out of said member.

72. In a wire fence machine, in combination, a movable member having an opening therethrough, the greatest width of said opening being in a direction oblique to the longitudinal axis of said member, said member having an obliquely disposed slot opening out of the member and arranged transversely to the width of said longitudinal opening, means for feeding a wire across the end of said member, means operatively carried in the slot of the member and over which the wire may be formed into a staple, means for moving the member to adapt it to sever a wire blank from said wire and to subsequently bend the wire over said forming means into the form of a staple, the width of the staple conforming to the width of the longitudinal opening in the member, and means operating in the member for releasing the forming means from the staple and forcing the staple out of the member.

73. In a wire fence machine, in combination, means for feeding strand wires, means for feeding stay wires across the strand wires, means for feeding a tie-wire stock across and opposite the juncture of the strand and stay wires, obliquely to the line of movement of the strand wires, a movable member over which a tie-wire is formed, a movable member for severing a tie-wire-blank from the tie-wire stock and forming said tie wire blank into a staple over said forming member, and means for releasing the forming member from the staple, said releasing means adapted to engage the staple and project the same across the juncture of the stay and strand wires.

74. In a wire fence machine, in combination, means for feeding strand wires, means for feeding stay wires across the strand wires, means for feeding a tie-wire stock across and opposite the juncture of the strand and stay wires, and obliquely to the line of movement of the strand wires, a movable member over which a tie wire is formed, a movable member for severing a tie-wire blank from the tie wire stock and forming said tie-wire blank into a staple over said forming member, means for releasing the forming member from the staple, said releasing means adapted to engage the staple and project the same toward and across the juncture of the stay and strand wires, and means with which the ends of the staple engage to force them about one of said wires.

75. In a wire fence machine, in combination, means for feeding strand wires, means for feeding stay wires across the strand wires, means for feeding a tie wire stock across and opposite the juncture of the strand and stay wires, obliquely to the line of movement of the strand wires, means for severing a tie wire blank from said tie wire stock sufficient to form a tie adapted to have its ends wrapped around one of such fence wires, and means for uniting the tie wire to the strand and stay wires, such means acting upon the tie wire to cause its ends to be wrapped around one of such fence wires, said means during such wrapping operation, operating in a direction from the arcuate portion of the tie wire toward the ends of such tie wire.

76. In a wire fence machine, in combination, means for feeding strand wires, means for feeding stay wires across the strand wires, means for feeding a tie wire stock across and opposite the juncture of the strand and stay wires, obliquely to the line of movement of the strand wires, means for severing a tie wire blank from said tie wire stock sufficient to form a tie adapted to have its ends tied around one of such fence wires, and means for uniting the tie wire to the strand and stay wires, such means acting upon the tie wire to cause the same to be clenched and its ends tied around one of said fence wires, said means during the clenching and tying operation, operating in a direction from the arcuate portion of the tie wire toward the ends of such tie wire.

77. In a wire fence machine, in combination, means for feeding strand wires, means for feeding stay wires across the strand wires, means for feeding a tie wire stock across and opposite the juncture of the strand and stay wires, obliquely to the line of movement of the strand wires, means for severing a tie wire blank from said tie wire stock sufficient to form a tie adapted to have its ends wrapped around one of such fence wires, means for uniting the tie wire to the strand and stay wires, such means acting upon the tie wire to cause its ends to be wrapped around one of such fence wires, said means during such wrapping operation, operating in a direction from the arcuate portion of the tie wire toward the ends of such tie wire, and means for forming the tie wire into a U-shaped staple prior to the operation of said uniting means.

78. In a wire fence machine, in combination, means for feeding strand wires, means for feeding stay wires across the strand wires, means for feeding a tie wire stock to a position to have severed therefrom a tie wire blank, means for severing the tie wire blank from said tie wire stock sufficient to form a tie adapted to have its ends wrapped around one of such fence wires and with an arcuate portion of said tie engaging the juncture of said wires, and means for uniting the tie wire to the strand and stay wires, such means acting upon the tie wire to cause its ends to be wrapped around one of such fence wires, said means during such wrapping operation, operating on the tie wire in a direction from the arcuate portion of the tie wire toward the ends of such tie wire.

79. In a wire fence machine, in combination, means for feeding strand wires, means for feeding stay wires across the strand wires, means for feeding a tie wire stock to a position to have severed therefrom a tie wire blank, means for severing the tie wire blank from the said tie wire stock sufficient to form a tie adapted to have its ends wrapped around one of such fence wires and with an arcuate portion of said tie engaging the juncture of said wires, means for uniting the tie wire to the strand and stay wires, such means acting upon the tie wire to cause its ends to be wrapped around one of such fence wires, said means during such wrapping operation, operating in a direction from the arcuate portion of the tie wire toward the ends of such tie wire, and means for forming the tie wire into a U-shaped staple prior to the operation of said uniting means.

80. In a wire fence machine, in combination, means for feeding strand wires, means for feeding stay wires across the strand wires, means for feeding a tie wire stock across and opposite the juncture of the strand and stay wires, obliquely to the line of movement of the strand wires, means for severing a tie wire blank from said tie wire stock, means for forming the tie wire blank into a U-shaped staple, means for moving the staple from its forming position across the juncture of the fence wires, and means with which the ends of the staple engage for directing the ends of the staple around one of such fence wires.

81. In a wire fence machine, in combination, means for feeding strand wires, means for feeding stay wires across the strand wires, means for feeding a tie wire stock across and opposite the juncture of the strand and stay wires obliquely to the line of movement of the strand wires, means for severing a tie wire blank from said tie wire stock, means for forming the tie wire blank into a U-shaped staple, and means for moving the staple from its forming position across the juncture of the fence wires to adapt the staple to have its ends wrapped around one of such wires.

82. In a wire fence machine, in combination, means for feeding strand wires, means for feeding stay wires across the strand wires, means for feeding a tie wire stock to a position to have severed therefrom a tie wire blank, means for severing a blank from said tie wire stock, means for forming said tie wire blank into a U-shaped staple, and means for subsequently moving the staple from its forming position to a position to adapt it to have its ends wrapped around one of such fence wires.

83. In a wire fence machine, in combination, means for feeding strand wires, means for feeding stay wires across the strand wires, means for feeding a tie wire stock to a position to have severed therefrom a tie wire blank, means for severing a blank from said tie wire stock, means for forming said tie wire blank into a U-shaped staple, means for subsequently moving the staple from its forming position to a position to adapt it to have its ends wrapped around one of such fence wires, and means adapted to engage the ends of such staple to direct the ends thereof around one of such fence wires.

84. In a wire fence machine, in combination, means for feeding strand wires, means for feeding stay wires across the strand wires, means for feeding a tie wire stock to a position to have severed therefrom a tie wire blank, means for severing a blank from said tie wire stock, means for forming said tie wire blank into a U-shaped staple, and means for subsequently moving said staple from its forming position to a position to adapt it to have its ends wrapped around one of such fence wires, such movement of the staple placing the arcuate portion thereof across and in juxtaposition to the juncture of such fence wires, obliquely to the line of movement of the strand wires.

85. In a wire fence machine, in combination, a bed for supporting the wire connecting devices thereon, means for feeding strand wires upwardly through the bed, means for feeding stay wires across the strand wires, tie wire guides disposed obliquely in said bed and terminating at a point near the juncture of the crossing of the stay and strand wires, means for feeding tie wire stock through said tie wire guides and across and opposite the juncture of the stay and strand wires, obliquely to the line of movement of the strand wires, means for severing tie wire blanks from said tie wires, means for forming said blanks into U-shaped staples, means for subsequently moving the staples from their formed position across the juncture of the stay and strand wires, and means for causing the ends of the staples to be wrapped around one of such fence wires.

86. In a wire fence machine, in combination, a bed for supporting the wire connecting devices thereon, means for feeding the strand wires upwardly through the bed, means for feeding stay wires across the strand wires, tie wire guides connected with said bed and so disposed that tie wire stock fed therethrough will cross and opposite the juncture of the stay and strand wires in a direction obliquely to the line of movement of the strand wires, feeding means for tie wire stock, guiding tubes leading from the feeding means to said guides, through which said tie wire stock is fed, means for severing the tie wire blanks from said tie wires, means for forming said blanks into U-shaped staples, means for subsequently moving the staples from their formed position across the juncture of the stay and strand wires, and means for causing the ends of such staples to be wrapped around one of said fence wires.

87. In a wire fence machine, in combination, a bed for supporting the wire connecting devices thereon, means for feeding strand wires through the bed, means for feeding stay wires across the strand wires, tie wire stock feeding mechanism, means for actuating said mechanism; guides for the tie wire stock between the feeding mechanism therefor and the wire connecting devices, the terminals of said guides being disposed in such a manner as to feed the tie wire stock across and opposite the juncture of the stay and strand wires, obliquely to the line of movement of the strand wires, means for severing tie wire blanks from said tie wires, means for forming said blanks into U-shaped staples, means for subsequently moving the staples from their formed position across the juncture of the stay and strand wires, and means for causing the ends of such staples to be wrapped around one of such fence wires.

88. In a wire fence machine, in combination, wire connecting devices, means for feeding strand wires, means for feeding stay wires transversely of said strand wires, tie wire stock feeding means, comprising coöperating feed rolls, and guiding means for said tie wire stock, said guiding means disposed between the feeding means and wire connecting devices, said guiding means arranged obliquely to the strand and stay wires where they intersect, whereby the tie wires are fed across and opposite the juncture of the strand and stay wires obliquely to the line of movement of the strand wires.

89. In a wire fence machine, in combination, wire connecting devices, means for feeding strand wires, means for feeding stay wires transversely of said strand wires, tie wire stock feeding means, comprising coöperating feed rolls, means in operative connection with certain of said feed rolls for intermittently operating said rolls, and guiding means for said tie wire stock, said guiding means disposed between the feeding means and wire connecting devices, said guiding means arranged obliquely to the strand and stay wires where they intersect, whereby the tie wire is fed across and opposite the juncture of the strand and stay wires obliquely to the line of movement of the strand wires.

90. In a wire fence machine, in combination, wire connecting devices, means for feeding strand wires, means for feeding stay wires transversely of said strand wires, tie wire stock feeding means comprising a shaft, feed rolls on said shaft, ratchet actuating mechanism operatively connected with said shaft, other feed rolls coöperating with said first-mentioned rolls, tubes for guiding the tie wire stock from the feed rolls to the wire connecting devices, said tubes in proximity to said connecting devices being disposed at an oblique angle, whereby the tie wire stock will be fed across and opposite the juncture of the stay and strand wires obliquely to the line of movement of the strand wires.

91. In a machine of the class named, mechanism for feeding a series of wires into the machine, to be formed into tie wires, comprising a rotary shaft; a plurality of feed-rolls, fixed thereon; a plurality of idler rolls, engaging said feed-rolls; a plurality of tubes, adapted to receive the wires from said feed-rolls and guide them to the points of intersection of the strand wires and stay wires, obliquely to the line of movement of the strand wires; and means for suitably rotating said shaft.

92. In a machine of the class named, mechanism for feeding a series of wires into the machine, to be formed into tie wires, comprising a rotary shaft; a plurality of feed-rolls, fixed thereon; a plurality of idler rolls coöperating with said feed-rolls; guides for the wires disposed between said feed and idler rolls, said guides being cut away to allow the rolls to engage the wires passing through said guides, ratchet mechanism for operating the feed-rolls in a step-by-step movement; and a plurality of tubes adapted to receive the wires from said feed-rolls and guide them to the points of intersection of the strand and stay wires, obliquely to the line of movement of the strand wires.

93. In a machine of the class named, a bed-plate, means for feeding strand wires through said bed-plate, means for feeding stay wires transversely of the strand wires, a plurality of extensions arranged on the bed-plate and being disposed obliquely to the line of movement of the strand wires, feed-rolls for tie wire stock, and tubes leading from the rolls and connected with the extensions of the bed plate to guide the tie wire stock from the rolls to the juncture of the stay and strand wires.

94. In a machine of the class named, a bed plate, means for feeding strand wires through said bed plate, means for feeding stay wires transversely of the strand wires, a plurality of extensions arranged on the bed plate and being disposed obliquely to the line of movement of the strand wires, feed-rolls for tie wire stock, removable wire guides arranged in said extensions, tubes for the tie wire stock between the rolls in said extensions, and caps attached to the terminals of the tubes and also connected with the extensions of the bed plate.

95. In a machine of the character specified, in combination, wire coiling means, means for feeding a wire through said coiling means, a shearing member, means for feeding a wire through said shearing member and across said coiling means, a cutting member adapted to coöperate with said shearing member, a movable support for said cutting member, a rock shaft, and connections between the rock shaft and said movable support.

96. In a machine of the character specified, in combination, a wire coiler, means for feeding a strand wire through said coiler, means for feeding a stay wire transversely of the strand wire, and across the coiler, means for severing a stay length from the stay wire, and means for depressing the end of the stay length on to the coiler, and for inclining the end of the stay length in the direction in which it is intended to coil the same by the coiler.

97. In a machine of the character specified, in combination, a shearing member, a cutting member adapted to coöperate with said shearing member, a pivoted frame supporting said cutting member, a rock shaft, connections between said shaft and said frame, and means carried on the frame to engage and depress the wire severed by the action of the cutting and shearing members.

98. In a machine of the character specified, in combination, a shearing member having a wire opening therethrough, a cutting member movable relative to said shearing member, a movable frame for said cutting member, means for moving said frame, coiling means having a wire opening therethrough, and wire depressing means connected with said frame.

99. In a machine of the character specified, in combination, a shearing member, a cutting member adapted to coöperate with said shearing member, a pivoted frame supporting said cutting member, means for operating the frame, and means carried on the frame to engage and depress the wire severed by the action of the cutting and shearing members.

100. In a machine of the character specified, in combination, a coiling spindle, a shearing member, a cutting member adapted to coöperate with said shearing member, a pivoted frame supporting said cutting member, means for operating the frame, and means carried on the frame to engage the wire severed by the cutting and shearing members and to depress the same onto the end of the coiler into a position for coiling said wire on another wire.

101. In a machine of the character specified, in combination, a wire coiler, means for feeding a strand wire therethrough, means for feeding a stay wire transversely of the strand wire, means for severing a stay length, and means to depress the ends of the stay length after being severed from a stay wire, comprising a plate having a beveled wire engaging end, a movable support for said plate, and means for operating the plate.

102. In a machine of the character specified, in combination, a wire coiler having a beveled end, means for feeding a strand wire therethrough, means for feeding a stay wire transversely of the strand wire, and across the coiler, means for severing a stay length from the stay wire, and means to depress the ends of the stay length onto the beveled end of the coiler and for inclining the end of the stay length in the direction in which it is intended to coil the same by the coiler, comprising a plate having a beveled wire engaging end, a pivoted support for said plate, a rock shaft, and connections between said support and said rock shaft.

103. In a machine of the class described, a support, a die-member mounted thereon, a covering plate for said member, a nut sustained between the covering plate and the support, and adjusting means for the die member operatively connected with said nut.

104. In a machine of the class described, in combination, mechanism for severing a tie-wire from a tie-wire stock, comprising a movable member having a cutting edge, and a guiding member disposed obliquely to the direction of movement of said movable member for the tie wire stock and having a cutting edge with which the cutting edge of the movable member coöperates.

105. In a machine of the class described, the combination of the movable block 106 having the cutting edge 113 and the guide member 114 disposed obliquely to the direction of movement of the block 106 and having a cutting edge formed on its outer end with which the cutting edge of the member 106 coöperates.

106. In a machine of the character described, in combination, means for moving the tie-wire or member, comprising a reciprocal bar, a rock-shaft, connections between said bar and said rock-shaft, a cam, and means for operating said rock-shaft from said cam.

107. In a machine of the character described, in combination, a movable tie-wire cutting member, a plunger associated with said member and adapted to engage the tie wire after being cut, a rock-shaft, connections between the plunger and the rock-shaft, and means for operating said rock-shaft.

108. In a machine of the character described, in combination, means for feeding strand wires, means for feeding stay wires transversely of said strand wires, and spaced from said strand wires, a plurality of individual tie-wire severing devices, and means for simultaneously moving said devices for severing tie wires and subsequently to such severing operation, to engage said strand wires and move them into engagement with said stay wires.

109. In a wire fence machine, in combination, means for feeding a plurality of strand wires, means for feeding stay wires across the strand wires, means for feeding tie-wire stock to a position to have severed from such stock tie-wire blanks, means for severing blanks from said tie-wire stock, means for forming said blanks into U-shaped staples, and means for subsequently moving the staples from their forming position to a position to adapt the staples to be forced around the intersecting portions of the strand and stay wires.

110. In a wire fence machine, in combination, means for feeding a plurality of strand wires, means for feeding stay wires across the strand wires, means for feeding tie-wire stock to a position to have severed from such stock tie-wire blanks, means for severing blanks from said tie-wire stock, means for forming said blanks into U-shaped staples, means for subsequently moving the staples from their forming position to a position to adapt the staples to be forced around the intersecting portions of the strand and stay wires, and means adapted to engage the ends of the staples to force the same around the intersecting portions of the strand and stay wires.

111. In a wire fence machine, a stationary set of dies, a movable set of dies coöperating with the stationary set for grasping the intersecting portions of the wires forming the fence, both sets of dies having means for crimping the intersecting portions of the wires, means for forcing staples into said dies and around the intersecting portions of the wires, and a cam for actuating the movable set of dies, said cam having means for forcing the movable set of dies firmly against the stationary set before the staples are forced around the intersecting portions of the wires.

112. In a wire fence machine, a stationary set of dies, a movable set of dies coöperating with the stationary set for grasping the intersecting portions of the wires forming the fence, both sets of dies having means for crimping the intersecting portions of the wires, means for forming staples and forcing the same into the dies and around the intersecting portions of the wires, and means co-acting with the movable set of dies to temporarily force them firmly into engagement with the intersecting portions of the fence wires to crimp the same before the staples are forced into the dies.

In testimony whereof I affix my signature in presence of two witnesses.

BENJAMIN L. SOMMER.
*Executor of the estate of Joseph W. Sommer.*

Witnesses:
CHAS. F. BAILEY,
CHAS. W. LA PORTE